US011553480B2

(12) United States Patent
Horiuchi et al.

(10) Patent No.: US 11,553,480 B2
(45) Date of Patent: *Jan. 10, 2023

(54) BASE STATION, TERMINAL, AND COMMUNICATION METHOD

(71) Applicant: Panasonic Intellectual Property Corporation of America, Torrance, CA (US)

(72) Inventors: Ayako Horiuchi, Kanagawa (JP); Hidetoshi Suzuki, Kanagawa (JP)

(73) Assignee: Panasonic Intellectual Property Corporation of America, Torrance, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/195,983

(22) Filed: Mar. 9, 2021

(65) Prior Publication Data

US 2021/0195569 A1 Jun. 24, 2021

Related U.S. Application Data

(63) Continuation of application No. 16/479,212, filed as application No. PCT/JP2018/001517 on Jan. 19, 2018, now Pat. No. 10,980,019.

(30) Foreign Application Priority Data

Mar. 17, 2017 (JP) ................................ 2017-052867

(51) Int. Cl.
*H04W 4/00* (2018.01)
*H04W 72/04* (2009.01)

(52) U.S. Cl.
CPC ....... *H04W 72/044* (2013.01); *H04W 72/042* (2013.01)

(58) Field of Classification Search
CPC . H04W 72/044; H04W 72/042; H04W 88/08; H04L 5/0053; H04L 5/0094
(Continued)

(56) References Cited

U.S. PATENT DOCUMENTS 10,652,876 B2 5/2020 Seo et al.
10,980,019 B2 * 4/2021 Horiuchi .............. H04L 5/0094
(Continued)

FOREIGN PATENT DOCUMENTS

JP 2014-150387 A 8/2014
WO 2014/042356 A1 3/2014
WO 2017/028071 A1 2/2017

OTHER PUBLICATIONS

Guangdong OPPO Mobile Telecom, "On NR PDCCH Structure and CCE-PRB mapping," R1-1701950, Agenda Item: 8.1.3.1.3, 3GPP TSG RAN WG1 meeting #88, Athens, Greece, Feb. 13-17, 2017, 7 pages.
(Continued)

*Primary Examiner* — Chuong T Ho
(74) *Attorney, Agent, or Firm* — Seed IP Law Group LLP

(57) ABSTRACT

In a base station, a signal allocating unit allocates downlink control signals (DCI) to a control channel region (CORESET) constituted by a plurality of control channel elements (CCEs), and a transmitting unit transmits the downlink control signals. In this case, the number of resource element groups (REGs) that constitute the CCE is a power of 2, and a bundling size indicating the number of REGs included in the REGs that constitute the CCE and arranged in adjacent resource blocks is a power of 2.

12 Claims, 21 Drawing Sheets

(58) Field of Classification Search
USPC .................................................. 370/329, 330
See application file for complete search history.

(56) References Cited

U.S. PATENT DOCUMENTS

| | | | |
|---|---|---|---|
| 2014/0321420 | A1 | 10/2014 | Nakashima et al. |
| 2015/0003349 | A1 | 1/2015 | Kim et al. |
| 2015/0372777 | A1 | 12/2015 | Sano et al. |
| 2016/0302174 | A1 | 10/2016 | Chatterjee et al. |
| 2018/0132243 | A1 | 5/2018 | Yang et al. |
| 2018/0227156 | A1* | 8/2018 | Papasakellariou .. H04W 72/042 |
| 2019/0268208 | A1 | 8/2019 | Seo et al. |
| 2020/0021419 | A1 | 1/2020 | Taherzadeh Boroujeni et al. |

OTHER PUBLICATIONS

Huawei, HiSilicon, "PRB bundling size for DL data precoding," R1-1700413, Agenda Item: 5.1.2.1, 3GPP TSG RAN WG1 NR Ad Hoc Meeting, Spokane, USA, Jan. 16-20, 2017, 6 pages.

Motorola, "Search Space Definition: Reduced PDCCH Blind Detection for Split PDCCH Search Space," R1-080079, Agenda Item: 6.1.3, 3GPP TSG RAN1#51bis, Sevilla, Spain, Jan. 14-18, 2008, 3 pages.

Panasonic, "RE mapping for ePDCCH," R1-123287, Agenda Item: 7.6.1, 3GPP TSG RAN WG1 Meeting #70, Qingdao, China, Aug. 13-17, 2012, 8 pages.

3GPP TSG RAN WG1 Meeting #88, R1-1702765, "DL control channel design", Feb. 2017.

3GPP TSG RAN Meeting #73, RP-161596, "Revision of SI: Study on New Radio Access Technology", Sep. 2016.

3GPP TSG RAN WG1 Meeting #88, R1-1701585, "NR DL Control Channel Structure", Feb. 2017.

3GPP TSG RAN WG1 Meeting #88, R1-1703238, "CCE to REG mapping for NR", Feb. 2017.

3GPP TSG RAN WG1 Meeting #88, R1-1702971, "Resource Mapping for NR-PDCCH", Feb. 2017.

3GPP TSG RAN WG1 Meeting #88, R1-1703448, "DL control channel design", Feb. 2017.

Intel Corporation: "NR PDCCH structure", 3GPP Draft; R1-1702220 PDCCH Structure, 3rd Generation Partnership Project (3GPP), Mobile Competence Centre; 650, Route Des Lucioles ; F-06921 Sophia-Antipolis Cedex; France, vol. RAN WG1, Meeting #88. Athens. Greece; Feb. 13, 2017-Feb. 17, 2017, Feb. 13-17, 2017, XP051209378.

International Search Report of PCT application No. PCT/JP2018/001517 dated Apr. 17, 2018.

Qualcomm Incorporated: "PDCCH control resource set and search space", 3GPP Draft; R1-1702628 PDCCH Control Resource Set and Search Space, 3rd Generation Partnership Project (3GPP), Mobile Competence Centre; 650, Route Des Lucioles ; F-06921 Sophia-Antipolis Cedex ; France, vol. RAN WG1, Meeting #88. Athens, Greece; Feb. 13, 2017-Feb. 17, 2017, Feb. 13-17, 2017, XP051221485.

The Extended European Search Report dated Feb. 17, 2020 for the related European Patent Application No. 18766705.0, 8 pages.

MediaTek Inc., Discussion on NR-PDCCH structure [online], 3GPP TSG RAN WG1 #88 R1-1702722, Internet<URL:http://www.3gpp.org/ftp/tsg_ran/WG1_RL1/TSGR1_88/Docs/R1-1702722> Feb. 7, 2017.

* cited by examiner

FIG. 4

| | AL 1 | | | AL 2 | | | AL 4 | | | AL 8 | | |
|---|---|---|---|---|---|---|---|---|---|---|---|---|
| Symbol #0 | 0 | 2 | 2 | 2 | 2 | 4 | 4 | 6 | 6 | 10 | 10 | 12 |
| Symbol #1 | 2 | 0 | 2 | 2 | 4 | 2 | 6 | 4 | 6 | 10 | 12 | 10 |
| Symbol #2 | 2 | 2 | 0 | 4 | 2 | 2 | 6 | 6 | 4 | 12 | 10 | 10 |

100

200

100
DL DATA SIGNALS
103
ERROR-CORRECTION ENCODING UNIT
104
MODULATING UNIT
105
SIGNAL ALLOCATING UNIT
106
TRANSMITTING UNIT
101
CORESET SETTING UNIT
102
DCI GENERATING UNIT
UL DATA SIGNALS
110
ERROR-CORRECTION DECODING UNIT
109
DEMODULATING UNIT
108
SIGNAL SEPARATING UNIT
107
RECEIVING UNIT 200
207
ERROR-CORRECTION ENCODING UNIT
208
MODULATING UNIT
209
SIGNAL ALLOCATING UNIT
210
TRANSMITTING UNIT
TRANSMISSION DATA SIGNALS
203
DCI RECEIVING UNIT
206
SETTING-INFORMATION RECEIVING UNIT
205
ERROR-CORRECTION DECODING UNIT
204
DEMODULATING UNIT
202
SIGNAL SEPARATING UNIT
201
RECEIVING UNIT
RECEPTION DATA SIGNALS symbol
0
1
2
3
PRB#0
PRB#1
PRB#2
PRB#3
PRB#4
PRB#5
PRB#6
PRB#7
PRB#8
PRB#9
PRB#10
PRB#11
PRB#12
PRB#13
PRB#14
PRB#15
NR-CCE
NR-CCE
Aggregation level 2

FIG. 11

| | AL 1 | AL 2 | AL 4 | AL 8 |
|---|---|---|---|---|
| Symbol #0 | 2 | 4 | 8 | 16 |
| Symbol #1 | 2 | 4 | 8 | 16 |

FIG. 12

| | AL 1 | | AL 2 | AL 4 | AL 8 |
|---|---|---|---|---|---|
| Symbol #0 | | 2 | 2 | 4 | 8 |
| Symbol #1 | | 2 | 2 | 4 | 8 |
| Symbol #2 | 2 | | 2 | 4 | 8 |
| Symbol #3 | 2 | | 2 | 4 | 8 |

FIG. 14

| | AL 1 | | AL 2 | AL 4 | AL 8 |
|---|---|---|---|---|---|
| Symbol #0 | 2 | | 2 | 4 | 8 |
| Symbol #1 | 2 | | 2 | 4 | 8 |
| Symbol #2 | | 2 | 2 | 4 | 8 |

symbol
0
1
2
3
PRB#0
PRB#1
PRB#2
PRB#3
PRB#4
PRB#5
PRB#6
PRB#7
PRB#8
PRB#9
PRB#10
PRB#11
PRB#12
PRB#13
PRB#14
PRB#15
DMRS
NR-CCE
NR-CCE
Aggregation level 2
NR-CCE
(Aggregation level 1)

Aggregation level 2
NR-CCE
NR-CCE
symbol
0
1
2
3
PRB#0
PRB#1
PRB#2
PRB#3
PRB#4
PRB#5
PRB#6
PRB#7
PRB#8
PRB#9
PRB#10
PRB#11
PRB#12
PRB#13
PRB#14
PRB#15
DMRS

FIG. 18

| | AL 1 | AL 2 | AL 4 | AL 8 |
|---|---|---|---|---|
| Symbol #0 | 3 | 6 | 12 | 24 |
| Symbol #1 | 3 | 6 | 12 | 24 |

FIG. 19

| | AL 1 | | AL 2 | AL 4 | AL 8 |
|---|---|---|---|---|---|
| Symbol #0 | 0 | 3 | 3 | 6 | 12 |
| Symbol #1 | 0 | 3 | 3 | 6 | 12 |
| Symbol #2 | 3 | 0 | 3 | 6 | 12 |
| Symbol #3 | 3 | 0 | 3 | 6 | 12 |

FIG. 20

| | AL 1 | AL 2 | AL 4 | AL 8 |
|---|---|---|---|---|
| Symbol #0 | 2 | 4 | 8 | 16 |
| Symbol #1 | 2 | 4 | 8 | 16 |
| Symbol #2 | 2 | 4 | 8 | 16 |

FIG. 21

| | AL 1 | | AL 2 | AL 4 | AL 8 |
|---|---|---|---|---|---|
| Symbol #0 | 0 | 2 | 2 | 4 | 8 |
| Symbol #1 | 0 | 2 | 2 | 4 | 8 |
| Symbol #2 | 0 | 2 | 2 | 4 | 8 |
| Symbol #3 | 2 | 0 | 2 | 4 | 8 |
| Symbol #4 | 2 | 0 | 2 | 4 | 8 |
| Symbol #5 | 2 | 0 | 2 | 4 | 8 |

BASE STATION, TERMINAL, AND COMMUNICATION METHOD

TECHNICAL FIELD

The present disclosure relates to a base station, a terminal, and a communication method.

BACKGROUND ART

A study is being conducted on a communication system called the fifth-generation mobile communication system (5G). In 5G, a study is being conducted on flexibly providing functions for each of use cases in which an increase in communication traffic, an increase in the number of terminals to be connected, high reliability, and low latency are respectively needed. Three use cases, that is, a use case for enhanced mobile broadband (eMBB: enhanced Mobile Broadband), a use case for large-scale communications/massive connection (mMTC: massive Machine Type Communications), and a use case for ultra-reliable and low-latency communication (URLLC: Ultra Reliable and Low Latency Communication), are available as typical use cases. 3GPP (the 3rd Generation Partnership Project), which is an international standardization group, is studying sophisticating a communication system from two embodiments of sophisticating an LTE system and a new RAT (Radio Access Technology) (see, for example, NPL 1).

CITATION LIST

Non Patent Literature

NPL 1: RP-161596, "Revision of SI: Study on New Radio Access Technology", NTT DOCOMO, September 2016

NPL 2: R1-1702765, "DL control channel design", Panasonic, February 2017

SUMMARY OF INVENTION

In the new RAT, a study is being conducted on setting, for a terminal (UE: user equipment), a plurality of control resource sets (hereinafter referred to as "CORESETs") as a region in which a PDCCH (Physical Downlink Control Channel), which is a control signal channel including a DCI (downlink control indicator), is arranged. However, in the new RAT, no sufficient study has been conducted on a method for arranging CCEs (control channel elements) that constitute a search space in a CORESET.

One embodiment of the present disclosure facilitates providing a base station, a terminal, and a communication method that can appropriately arrange CCEs that constitute a search space in a CORESET.

A base station according to one embodiment of the present disclosure comprises: circuitry that allocates downlink control signals to a control channel region constituted by a plurality of control channel elements (CCEs); and a transmitter that transmits the downlink control signals. The number of resource element groups (REGs) that constitute the CCE is a power of 2, and a bundling size indicating the number of REGs included in the REGs that constitute the CCE and arranged in adjacent resource blocks is a power of 2.

A terminal according to one embodiment of the present disclosure comprises: a receiver that receives downlink control signals in a control channel region constituted by a plurality of control channel elements (CCEs); circuitry that decodes the downlink control signals. The number of resource element groups (REGs) that constitute the CCE is a power of 2, and a bundling size indicating the number of REGs included in the REGs that constitute the CCE and arranged in adjacent resource blocks is a power of 2.

In a communication method according to one embodiment of the present disclosure, downlink control signals are allocated to a control channel region constituted by a plurality of control channel elements (CCEs), and the downlink control signals are transmitted. The number of resource element groups (REGs) that constitute the CCE is a power of 2, and a bundling size indicating the number of REGs included in the REGs that constitute the CCE and arranged in adjacent resource blocks is a power of 2.

In a communication method according to one embodiment of the present disclosure, downlink control signals are received with a control channel region constituted by a plurality of control channel elements (CCEs), and the downlink control signals are decoded. The number of resource element groups (REGs) that constitute the CCE is a power of 2, and a bundling size indicating the number of REGs included in the REGs that constitute the CCE and arranged in adjacent resource blocks is a power of 2.

These general or specific embodiments may be realized by a system, an apparatus, a method, an integrated circuit, a computer program, or a recording medium or may be realized by an arbitrary combination of a system, an apparatus, a method, an integrated circuit, a computer program, and a recording medium.

Advantageous Effects of Invention

According to one embodiment of the present disclosure, it is possible to appropriately arrange CCEs that constitute a CORESET.

Additional benefits and advantages of one embodiment of the present disclosure will become apparent from the specification and drawings. Such benefits and/or advantages are individually obtained by some embodiments and features stated in the specification and drawings, which need not all be provided in order to obtain one or more of the same features.

BRIEF DESCRIPTION OF DRAWINGS

FIG. 4 illustrates one example of the numbers of per-symbol REGs that constitute the same DCI for respective aggregation levels.

FIG. 11 illustrates one example of the numbers of per-symbol REGs that constitute the same DCI for respective aggregation levels according to operation example 1-1 in the first embodiment.

FIG. 12 illustrates one example of the numbers of per-symbol REGs that constitute the same DCI for the respective aggregation levels according to operation example 1-1 in the first embodiment.

FIG. 14 illustrates one example of the numbers of per-symbol REGs that constitute the same DCI for the respective aggregation levels according to operation example 1-2 in the first embodiment.

FIG. 18 illustrates one example (when the number of symbols is 2) of the numbers of per-symbol REGs that constitute the same DCI for the respective aggregation levels according to the second embodiment.

FIG. 19 illustrates one example (when the number of symbols is 4) of the numbers of per-symbol REGs that constitute the same DCI for the respective aggregation levels according to the second embodiment.

FIG. 20 illustrates one example (when the number of symbols is 3) of the numbers of per-symbol REGs that constitute the same DCI for the respective aggregation levels according to the second embodiment.

FIG. 21 illustrates one example (when the number of symbols is 6) of the numbers of per-symbol REGs that constitute the same DCI for the respective aggregation levels according to the second embodiment.

DESCRIPTION OF EMBODIMENTS

Embodiments of the present disclosure will be described below in detail with reference to the drawings.

As described above, in the new RAT, a study is being conducted on a technology in which a CORESET, which is a control channel region including a DCIs that are control signals, is set for a UE, and the UE monitors (blind-decodes) a search space in the set CORESET to detect DCIs addressed to the UE. Also, a study is being conducted on using CCEs to define the search space in which the DCIs are arranged.

In this case, in the new RAT, a number between 4 and 8 is considered as the number of REGs (resource element groups) per CCE. Also, a number from one symbol to all symbols in a slot or a subframe is conceivable as the number of symbols in which a CORESET is set.

However, the numbers of per-symbol REGs in respective CCEs become unequal, depending on a combination of the number of REGs per CCE and the number of symbols in which a CORESET is set. When the numbers of REGs across symbols are not equal in CCEs, there is a problem in that variations occur in reception SINRs (Signal to Interference and Noise Ratios) for the respective symbols, thus making it difficult to adjust power across the CCEs.

A description will be given below in more detail.

A DCI is transmitted with one or more CCEs. The number of CCEs used for one DCI is herein referred to as an "aggregation level". That is, the aggregation level indicates the amount of resources for transmitting a DCI. When a DCI is transmitted with a CORESET (a PDCCH region), for example, the DCI is transmitted with one CCE in aggregation level 1, and the DCI is transmitted with two CCEs in aggregation level 2.

Figure 1A:
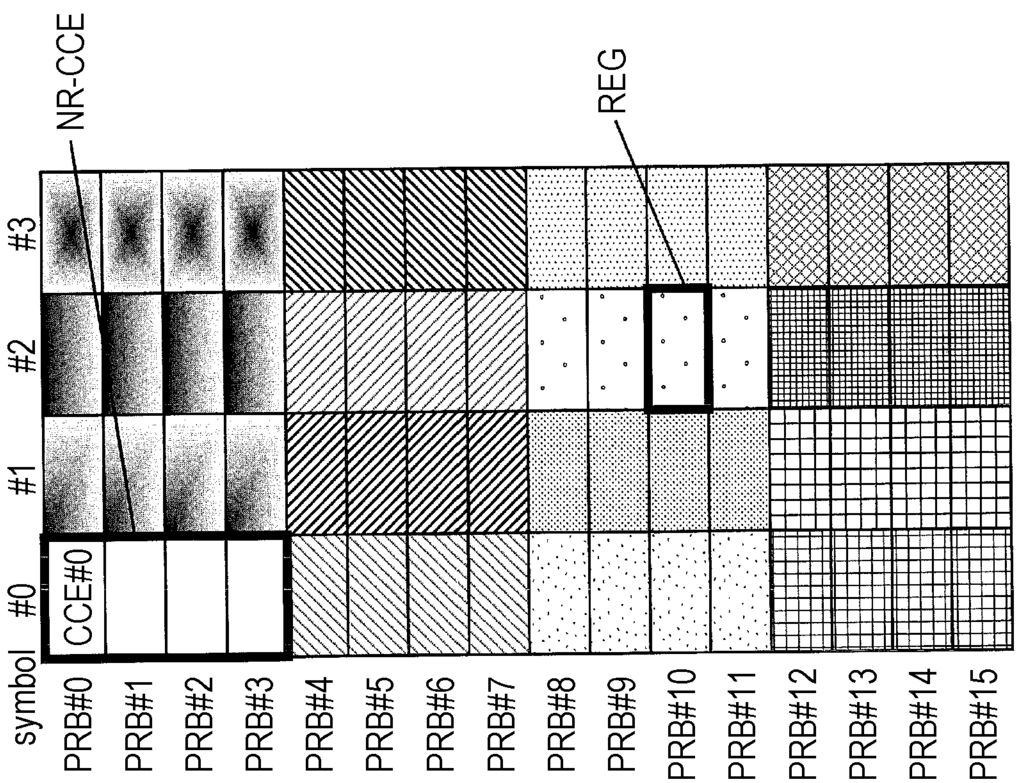
FIG. 1A illustrates a REG mapping example (frequency first mapping).

Also, setting one symbol in one PRB (physical resource block) as a "REG" is considered as one form of a plurality of REGs that constitute a CCE (see, for example, FIG. 1A).

Figure 1B:
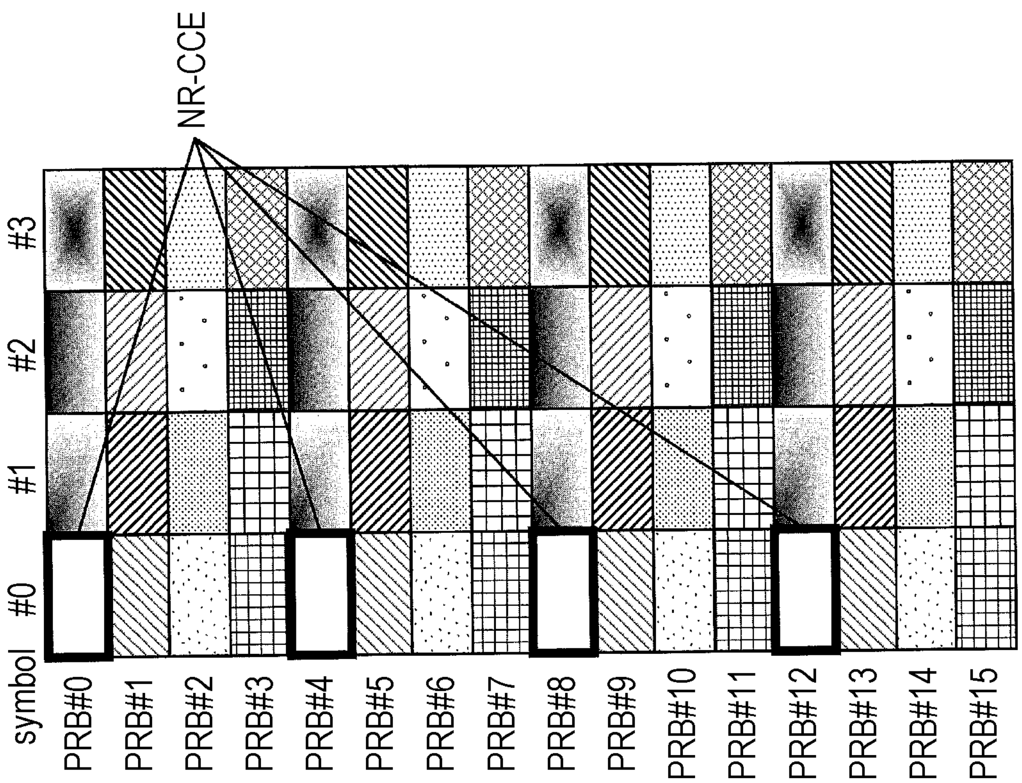
FIG. 1B illustrates a REG mapping example (frequency first mapping).
Figure 1C:
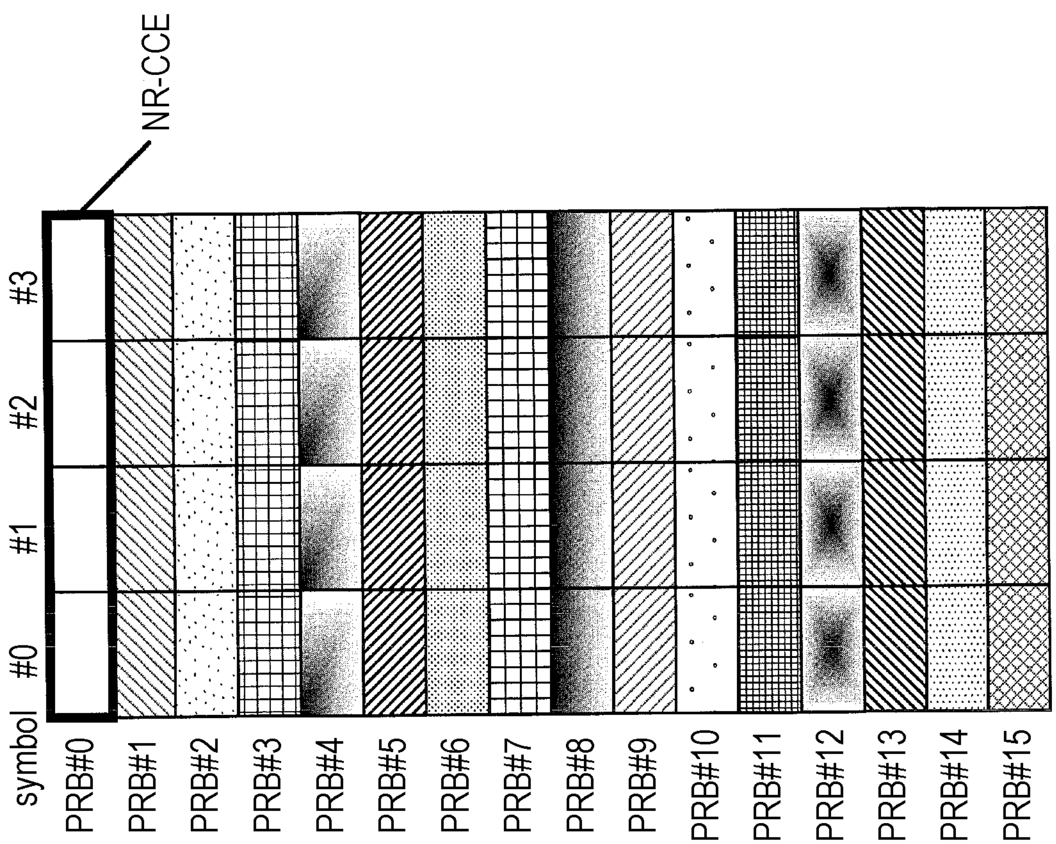
FIG. 1C illustrates a REG mapping example (time first mapping).
Figure 1D:
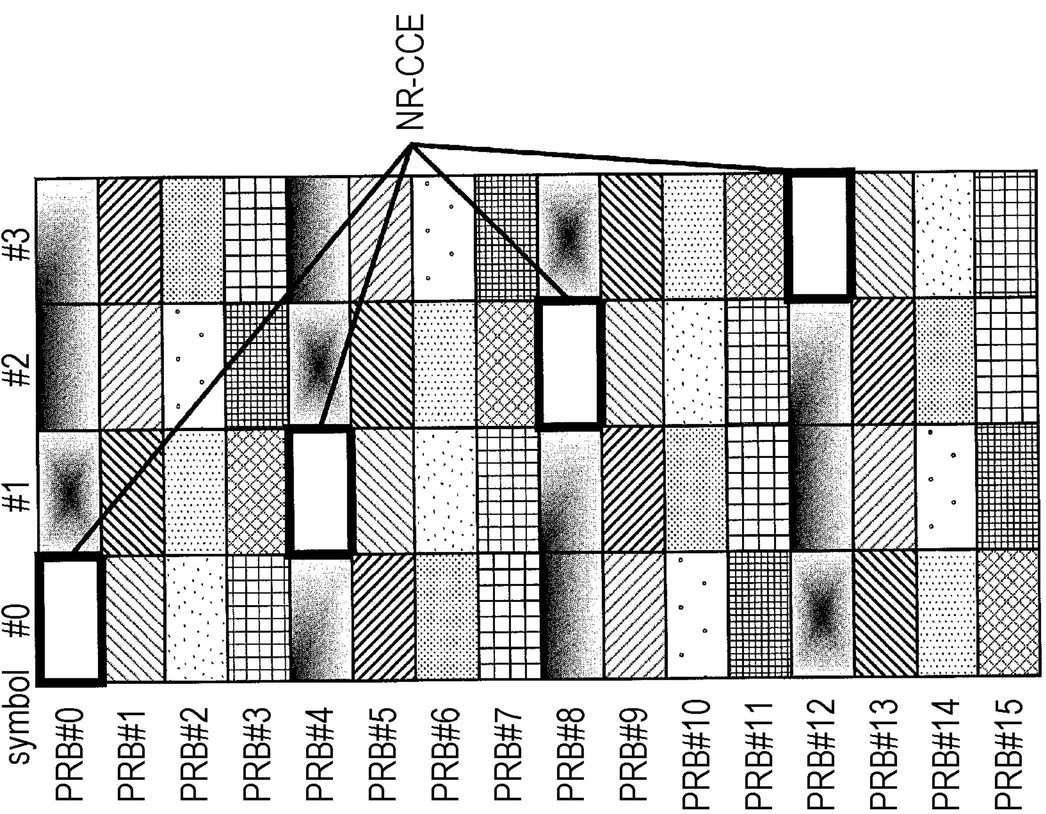
FIG. 1D illustrates a REG mapping example (time first mapping).

In the case of such a form, a case in which REGs arranged in the same symbol constitute a CCE (which may also be referred to as an "NR-CCE"), as illustrated in FIGS. 1A and 1B, and a case in which REGs arranged in a plurality of symbols constitute a CCE, as illustrated in FIGS. 1C and 1D, are conceivable as CCE configurations.

The case in which REGs that constitute one CCE are arranged in the same symbol is called "frequency first mapping". The frequency first mapping has advantages in that the number of symbols occupied by CCEs is reduced, and the amount of resources allocated to a PDSCH (Physical Downlink Shared Channel) increases. On the other hand, the case in which REGs that constitute one CCE are arranged in a plurality of symbols is called "time first mapping". The time first mapping has advantages in that CCEs can be transmitted with a plurality of symbols (see, for example, NPL 2) when there is a restriction on transmission power that can be used for each symbol, and thus the transmission power can be improved.

In the new RAT, a method called "REG bundling" is also studied. The REG bundling refers to a method in which a plurality of REGs that constitute the same CCE are arranged in adjacent PRBs, and the REGs share reference signals (DMRSs: Demodulation Reference Signals) arranged in the adjacent PRBs, to thereby improve the channel estimation accuracy.

Figure 2A:
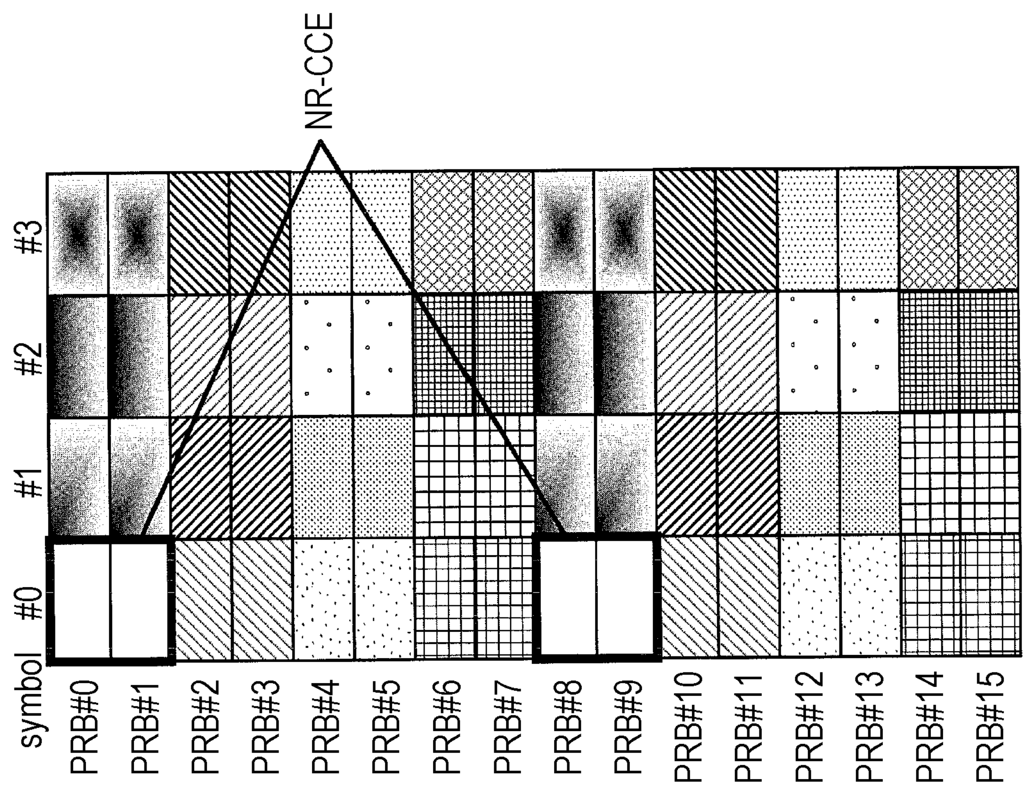
FIG. 2A illustrates one example of REG bundling.
Figure 2B:
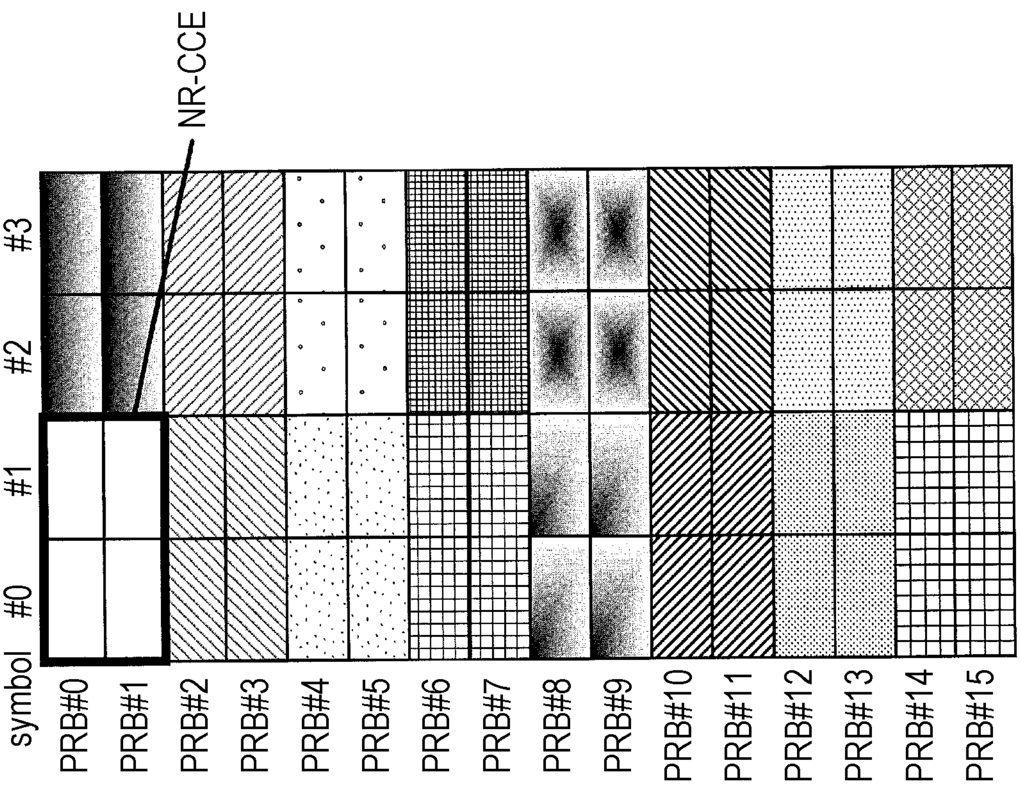
FIG. 2B illustrates one example of the REG bundling.
Figure 2C:
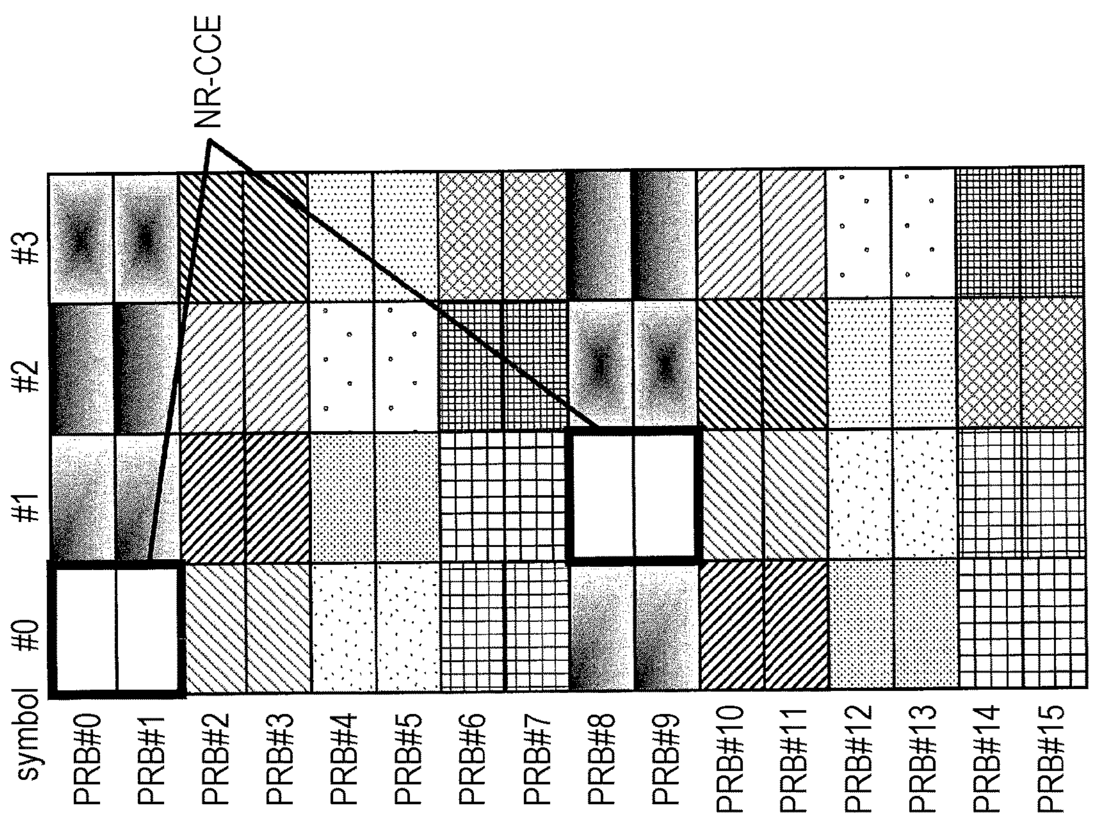
FIG. 2C illustrates one example of the REG bundling.

FIGS. 2A to 2C illustrate REG mapping examples (arrangement examples) when a bundling number (hereinafter referred to as a "REG bundling size"), which is the number of REGs arranged in adjacent PRBs, is 2. As illustrated in FIGS. 2A to 2C, two REGs of the REGs that constitute the same CCE are arranged in adjacent PRBs. As a result, even when a plurality of DMRSs is not arranged in the time direction (symbol direction), channel estimation can be interpolated in the frequency direction, thus making it possible to improve the channel estimation accuracy.

Figure 3:
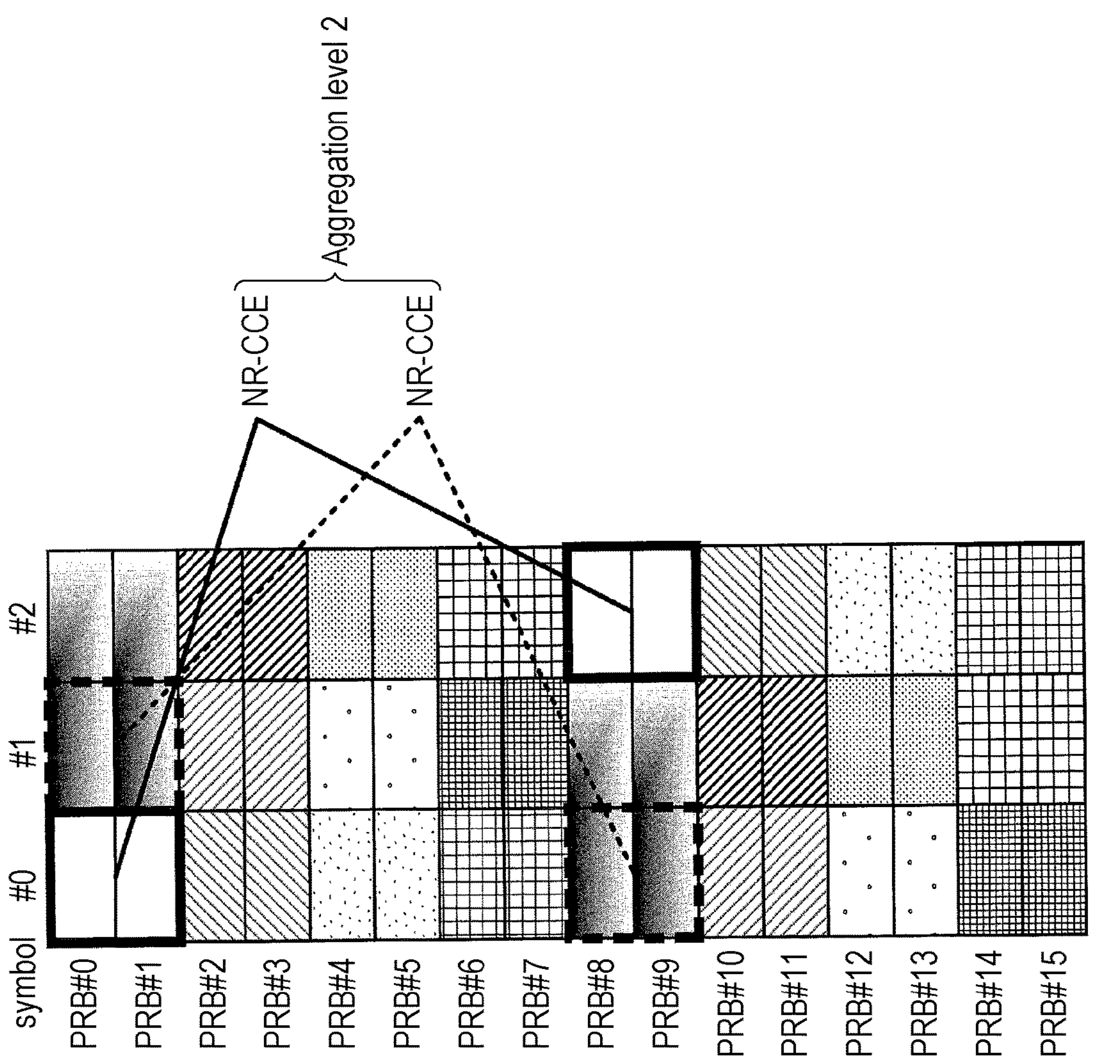
FIG. 3 illustrates a REG mapping example when the number of REGs per CCE is 4, the number of symbols is 3, and a REG bundling size is 2.

In this case, when the number of REGs per CCE is 4 or 8, and the number of symbols in a CORESET is 3, it is difficult to equally arrange REGs for each CCE in the three symbols. FIG. 3 illustrates a REG mapping example when the number of REGs per CCE is 4, the number of symbols in a CORESET is 3, and the REG bundling size is 2. Also, FIG. 4 illustrates, in the REG mapping example illustrated in FIG. 3, the numbers of per-symbol REGs that constitute the same DCI for respective aggregation levels (which may be referred to as "AL").

For example, in the case of aggregation level 1 (AL 1) in FIG. 3, that is, in a case in which the number of REGs in which a DCI is arranged is four, two REGs are arranged in each of two symbols of three symbols, and no REG is arranged in the remaining symbol. Also, in FIG. 3, in the case of aggregation level 2 (AL 2), that is, in a case in which the number of REGs in which a DCI is arranged is 8, four REGs are arranged in one symbol (symbol #0 in the example in FIG. 3) of three symbols, and two REGs are arranged in each of the remaining two symbols (symbols #1 and #2 in the example FIG. 3). The same applies to aggregation levels 4 and 8 (AL 4 and AL 8).

That is, as illustrated in FIG. 4, in AL 1, REGs that constitute one CCE used for transmitting a DCI are arranged in only two symbols and are not arranged in one symbol. Also, as illustrated in FIG. 4, in AL 2, AL 4, and AL 8, REGs that constitute a plurality of CCEs used for transmitting a DCI are unequally arranged across the symbols. Thus, since the numbers of REGs across symbols are not equal in one or more CCEs used for transmitting a DCI, variations occur in the reception SINRs for the respective symbols, thus making it difficult to adjust power across the CCEs.

Accordingly, the following description will be given of a method in which REGs that constitute a plurality of CCEs used for transmitting a DCI are uniformly arranged across symbols to thereby reduce variations in the reception SINRs for respective symbols and make it easy to adjust power across the CCEs.

First Embodiment

[Overview of Communication System]

A communication system according to each embodiment of the present disclosure includes a base station 100 and a terminal 200 (UE).

Figure 5:
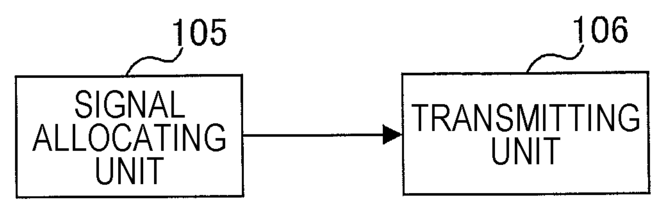
FIG. 5 illustrates the configuration of a portion of a base station according to a first embodiment.

FIG. 5 is a block diagram illustrating the configuration of a portion of the base station 100 according to an embodiment of the present disclosure. In the base station 100 illustrated in FIG. 5, a signal allocating unit 105 allocates downlink control signals (DCI) to a control channel region (CORESET) constituted by a plurality of control channel elements (CCEs). A transmitting unit 106 transmits the downlink control signals.

Figure 6:
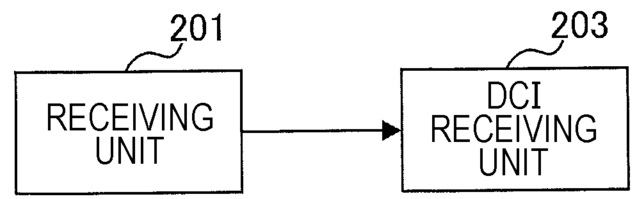
FIG. 6 illustrates the configuration of a portion of a terminal according to the first embodiment.

FIG. 6 is a block diagram illustrating the configuration of a portion of the terminal 200 according to the embodiment of the present disclosure. In the terminal 200 illustrated in FIG. 6, a receiving unit 201 receives downlink control signals (DCI) in a control channel region (CORESET) constituted by a plurality of control channel elements (CCEs). A DCI receiving unit 203 decodes (blind-decodes) the downlink control signals.

In this case, the number of resource element groups (REGs) that constitute a CCE is a power of 2, and the bundling size indicating the number of REGs included in the REGs that constitute the CCE and arranged in adjacent resource blocks is a power of 2.

[Configuration of Base Station]

Figure 7:
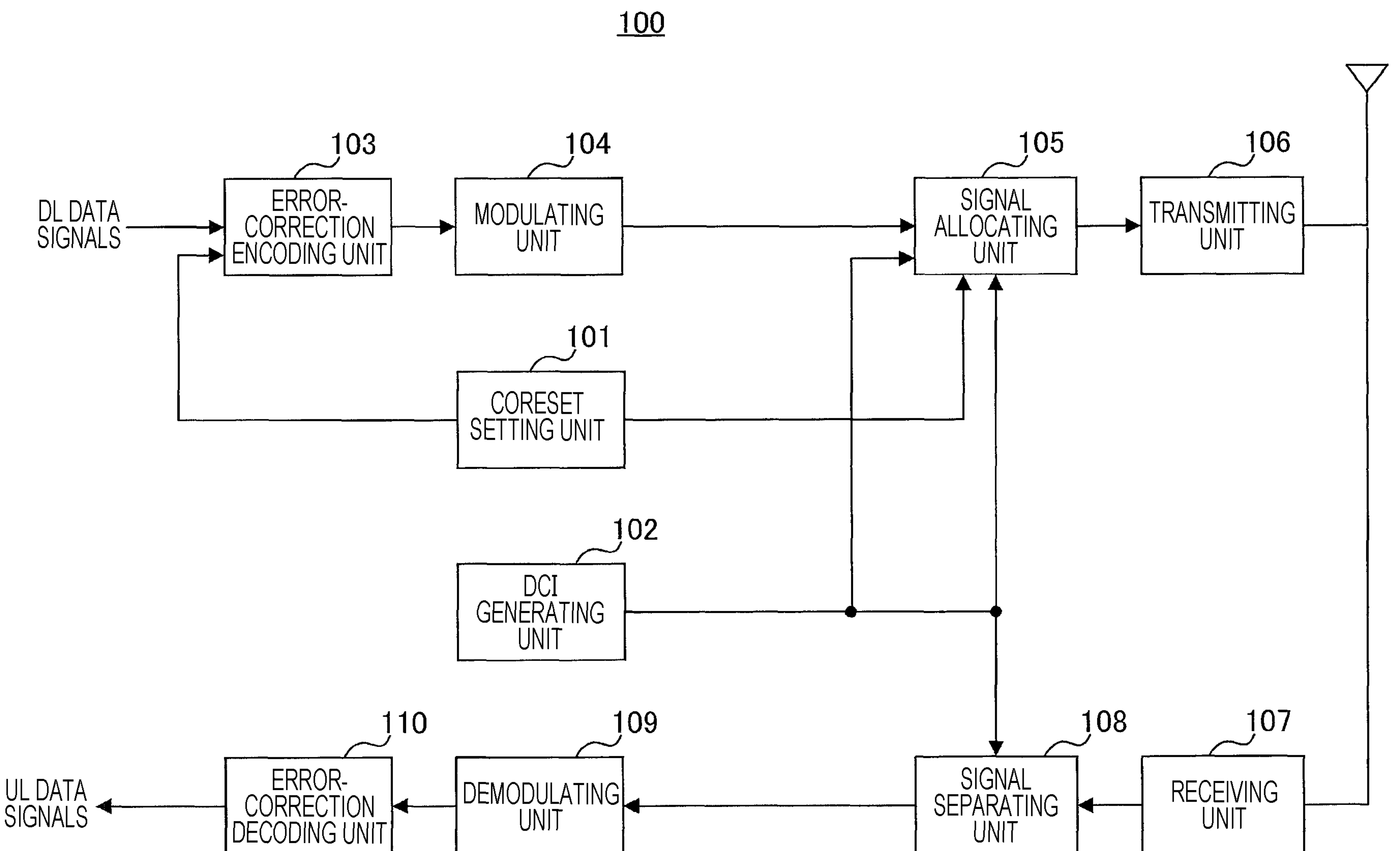
FIG. 7 illustrates the configuration of the base station according to the first embodiment.

FIG. 7 is a block diagram illustrating the configuration of the base station 100 according to the present embodiment. In FIG. 7, the base station 100 has a CORESET setting unit 101, a DCI generating unit 102, an error-correction encoding unit 103, a modulating unit 104, the signal allocating unit 105, the transmitting unit 106, a receiving unit 107, a signal separating unit 108, a demodulating unit 109, and an error-correction decoding unit 110.

The CORESET setting unit 101 sets a CORESET for each terminal 200 (UE). The setting (definition) of the CORESET includes, for example, the number of PRBs in which each CORESET is set, a PRB number, a symbol number, the number of symbols, an ID used for scrambling the CORESET, a REG (Resource Element Group) mapping method (localized or distributed), Quasi collocation (QCL), and so on. The CORESET setting unit 101 generates higher-layer signaling (for example, an SIB (System Information Block) or dedicated RRC (Radio Resource Control)) including CORESET-setting information indicating the setting of the CORESET. The CORESET setting unit 101 outputs higher-layer signaling to the error-correction encoding unit 103 and outputs the CORESET-setting information to the signal allocating unit 105.

The DCI generating unit 102 generates a DCI including resource allocation information (DL (Downlink) allocation information or UL (Uplink) allocation information) for DL data signals or UL data signals and outputs the DCI to the signal allocating unit 105. Also, the DCI generating unit 102 outputs the DL allocation information in the generated DCI to the signal allocating unit 105 and outputs the UL allocation information therein to the signal separating unit 108.

The error-correction encoding unit 103 performs error-correction encoding on transmission data signals (DL data signals) and the higher-layer signaling (CORESET-setting information) input from the CORESET setting unit 101 and outputs the encoded signals to the modulating unit 104.

The modulating unit 104 performs modulation processing on the signals received from the error-correction encoding unit 103 and outputs the modulated signals to the signal allocating unit 105.

Based on the DL allocation information input from the DCI generating unit 102, the signal allocating unit 105 allocates the signals (the DL data signals and the higher-layer signaling) received from the modulating unit 104 to downlink resources. Also, in accordance with the CORESET-setting information input from the DCI generating unit 102, the signal allocating unit 105 allocates the DCI input from the DCI generating unit 102 to resources (one or more CCEs in the CORESET). For example, the signal allocating unit 105 may change REG mapping or CCE mapping to a search space in accordance with the number of symbols in which a CORESET is set, the number being indicated in the CORESET-setting information. The transmission signals are formed as described above. The formed transmission signals are output to the transmitting unit 106.

The transmitting unit 106 performs wireless transmission processing, such as up-conversion, on the transmission signals input from the signal allocating unit 105 and transmits the transmission signals to the terminal 200 via an antenna.

The receiving unit 107 receives, via the antenna, signals transmitted from the terminal 200, performs wireless reception processing, such as down-conversion, on the reception signals and outputs the reception signal to the signal separating unit 108.

The signal separating unit 108 separates UL data signals from the reception signals received from the receiving unit 107, based on the UL allocation information input from the DCI generating unit 102, and outputs signals to the demodulating unit 109.

The demodulating unit 109 performs demodulation processing on the signals input from the signal separating unit 108 and outputs resulting signals to the error-correction decoding unit 110.

The error-correction decoding unit 110 decodes the signals input from the demodulating unit 109 to obtain the reception data signals (UL data signals) from the terminal 200.

[Configuration of Terminal]

Figure 8:
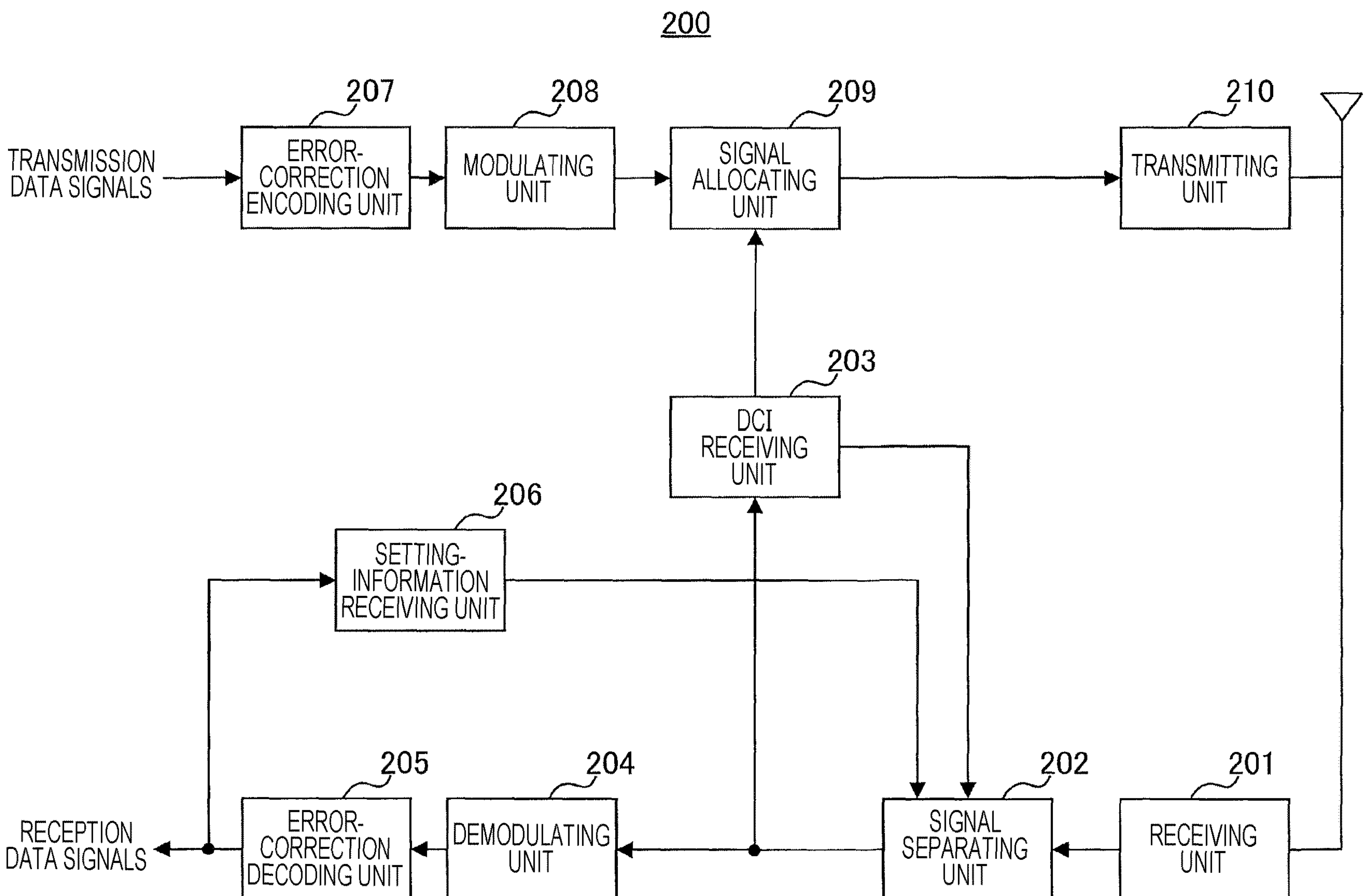
FIG. 8 illustrates the configuration of the terminal according to the first embodiment.

FIG. 8 is a block diagram illustrating the configuration of the terminal 200 according to the present embodiment. In FIG. 8, the terminal 200 has the receiving unit 201, a signal separating unit 202, the DCI receiving unit 203, a demodulating unit 204, an error-correction decoding unit 205, a setting-information receiving unit 206, an error-correction encoding unit 207, a modulating unit 208, a signal allocating unit 209, and a transmitting unit 210.

The receiving unit 201 receives reception signals via the antenna, performs reception processing, such as down-conversion, on the reception signals, and then outputs the reception signals to the signal separating unit 202. The reception signals include, for example, DL data signals, higher-layer signaling (including the CORESET-setting information), a DCI (including resource allocation information and so on), and so on.

The signal separating unit 202 separates uplink signals from the reception signals and outputs signals to the demodulating unit 204. Also, the signal separating unit 202 identifies resources corresponding to a CORESET to be monitored (a CORESET to be separated) from the reception signals received from the receiving unit 201, based on information indicating the CORESET setting input from the setting-information receiving unit 206, separates signals arranged in the resources, and outputs signals to the DCI receiving unit 203. Also, the signal separating unit 202 separates DL data signals from the reception signals, based on the DL allocation information input from the DCI receiving unit 203, and outputs signals to the demodulating unit 204.

The DCI receiving unit 203 attempts to decode the signals input from the signal separating unit 202 and arranged in resources corresponding to the CORESET and detects (receives) a DCI addressed to the local terminal. The DCI receiving unit 203 outputs the UL allocation information indicated by the received DCI to the signal allocating unit 209 and outputs the DL allocation information to the signal separating unit 202.

The demodulating unit 204 demodulates the signals input from the signal separating unit 202 and outputs the demodulated signals to the error-correction decoding unit 205.

The error-correction decoding unit 205 decodes the demodulated signals received from the demodulating unit 204, outputs resulting reception data signals, and outputs resulting higher-layer signaling to the setting-information receiving unit 206.

Based on the CORESET-setting information included in the higher-layer signaling output from the error-correction decoding unit 205, the setting-information receiving unit 206 identifies the setting of the CORESET for each terminal 200. The setting-information receiving unit 206 then outputs the identified information to the signal separating unit 202.

The error-correction encoding unit 207 performs error-correction encoding on the transmission data signals (UL data signals) and outputs the encoded data signals to the modulating unit 208.

The modulating unit 208 modulates the data signals input from the error-correction encoding unit 207 and outputs the modulated data signals to the signal allocating unit 209.

Based on the UL allocation information input from the DCI receiving unit 203, the signal allocating unit 209 identifies resources to which the UL data is to be allocated. The signal allocating unit 209 then allocates the data signals input from modulating unit 209 to the identified resources and outputs signals to the transmitting unit 210.

The transmitting unit 210 performs transmission processing, such as up-conversion, on the signals input from the signal allocating unit 209 and transmits transmission signals via the antenna.

[Operations of Base Station 100 and Terminal 200]

The operations of the base station 100 and the terminal 200 having the above-described configurations will be described in detail.

Figure 9:
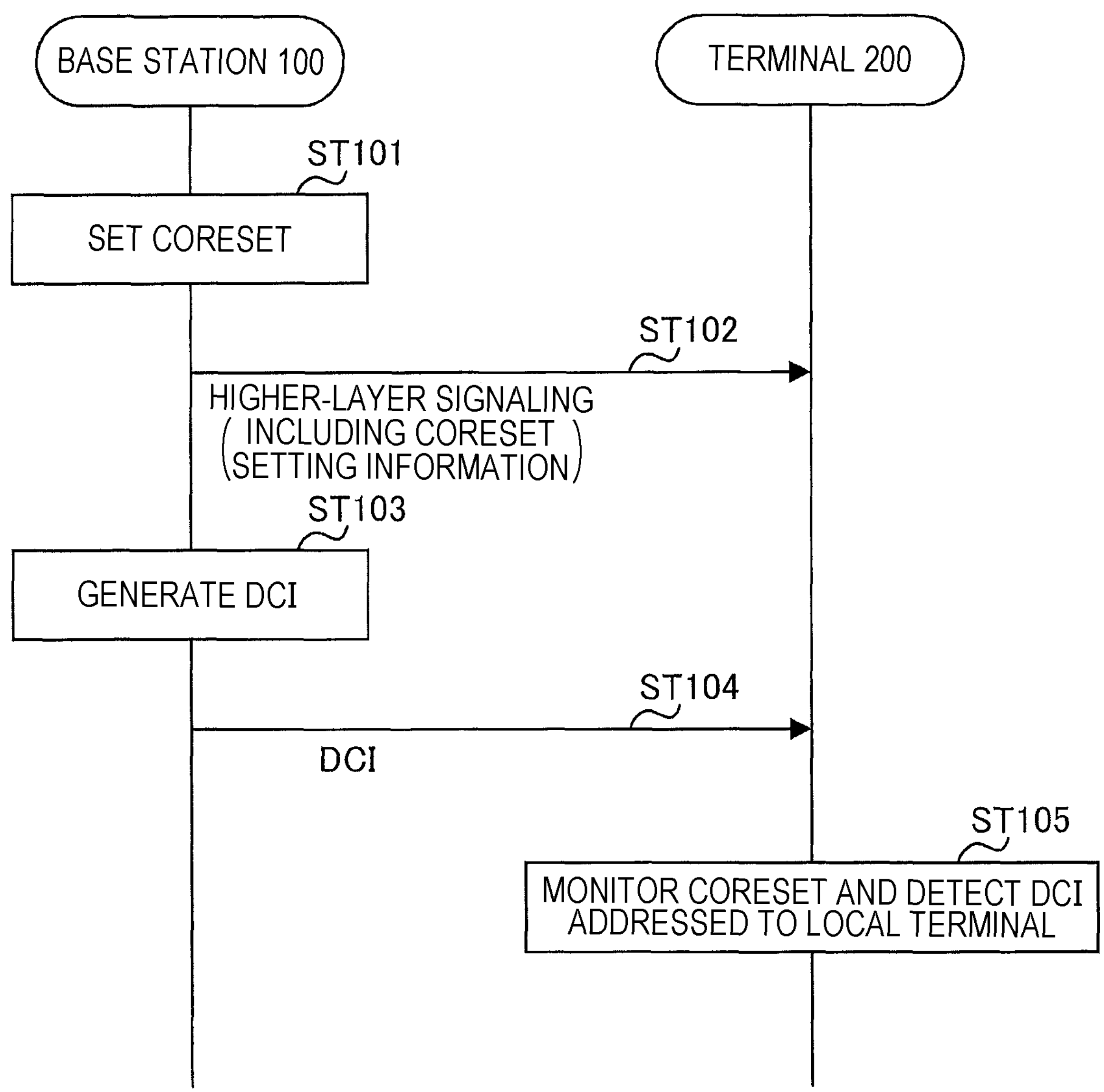
FIG. 9 illustrates an operation example of the base station and the terminal according to the first embodiment.

FIG. 9 is a sequence diagram illustrating the operations of the base station 100 and the terminal 200.

The base station 100 sets a CORESET for each terminal 200 (ST101). The base station 100 transmits setting information of the set CORESET to the terminal 200 by using higher-layer signaling (ST102). Next, the base station 100 generates a DCI including resource allocation information and so on (ST103). The base station 100 arranges the generated DCI in any of search spaces in the CORESET set in ST101 and transmits the DCI to the terminal 200 (ST104). Details of a mapping method (an arrangement method) for CCEs (REGs) that constitute a CORESET are described later.

Meanwhile, based on the CORESET-setting information included in the higher-layer signaling received in ST102, the terminal 200 monitors the CORESET (search space) to detect a DCI addressed to the local terminal 200 (ST105).

Next, a description will be given of details of a mapping method for CCEs (REGs) that constitute a CORESET.

Operation examples 1-1 to 1-3 according to the present embodiment will be individually described below.

Operation Example 1-1

In operation example 1-1, with respect to a CCE and REG mapping to a CORESET, the number of REGs that constitute a CCE (the number of REGs per CCE) is a power of 2, and the REG bundling size is a power of 2.

In addition, in operation example 1-1, the number of symbols in which a CORESET is set is a power of 2.

With such an arrangement, even when the number of symbols in a CORESET set for the terminal 200 differs, mapping of REGs that constitute a CCE in the CORESET becomes common, and the mapping of the REGs becomes simple.

Also, setting the REG bundling size to a power of 2 makes it easy to perform adjustment when different subcarrier spacings (numerology) are allocated to the same slot or when interference control is performed between cells.

Figure 10A:
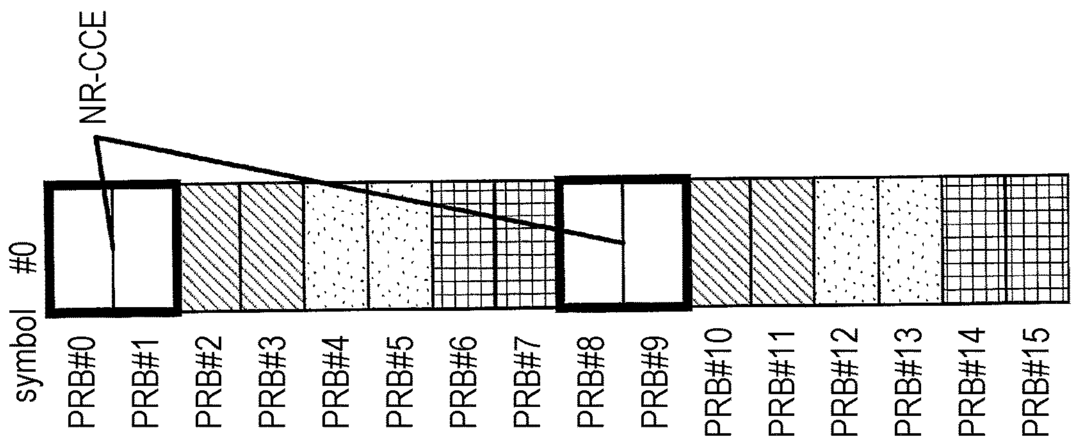
FIG. 10A illustrates a REG mapping example (when the number of symbols is 1) according to operation example 1-1 in the first embodiment.
Figure 10B:
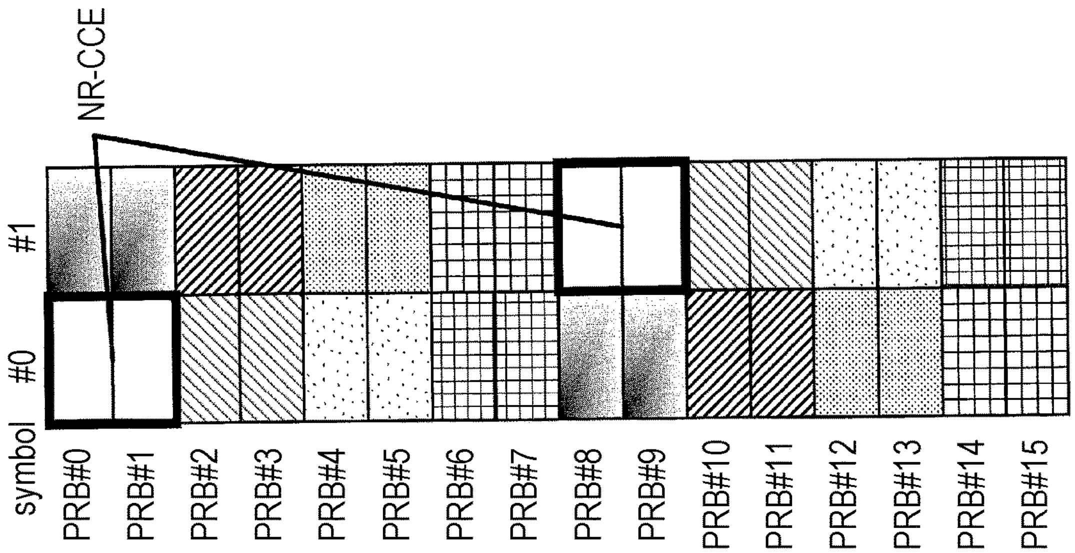
FIG. 10B illustrates a REG mapping example (when the number of symbols is 2) according to operation example 1-1 in the first embodiment.
Figure 10C:
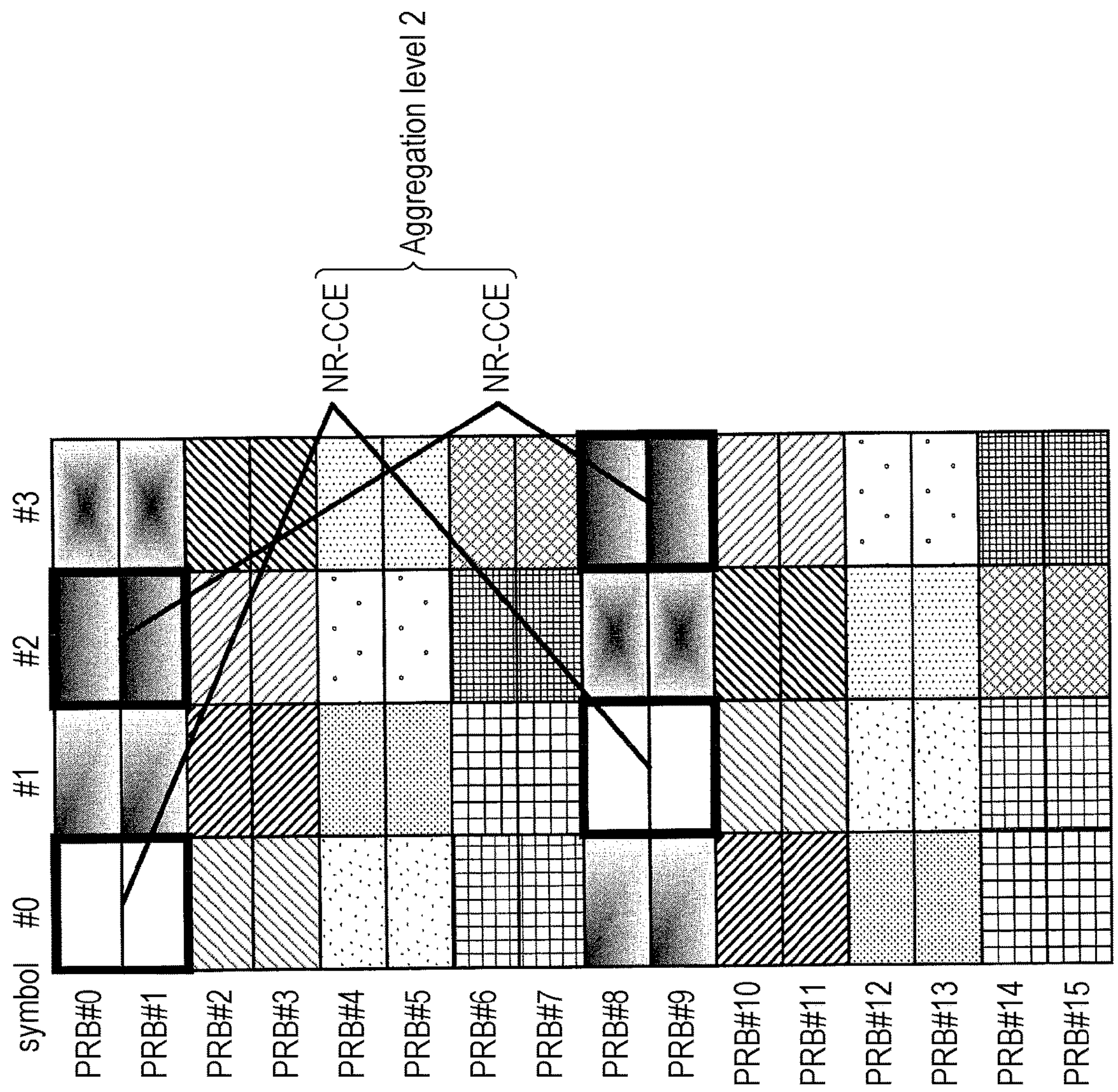
FIG. 10C illustrates a REG mapping example (when the number of symbols is 4) according to operation example 1-1 in the first embodiment.

FIGS. 10A to 10C illustrate REG mapping examples when the number of REGs per CCE is 4 ($=2^2$), and the REG bundling size is 2 ($=2^1$).

In FIGS. 10A to 10C, the REG mapping is the time first mapping. That is, REGs that constitute one CCE are arranged in the time direction (symbols) prior to the frequency direction (PRBs) in units of the REG bundling size. Also, in FIGS. 10A to 10C, the CCE mapping to the search space is also the time first mapping. That is, the base station 100 allocates a DCI in the time direction (symbols) prior to the frequency direction (PRBs) in units of a CCE. As a result, REGs that constitute a CCE used for transmitting a DCI are arranged in different symbols as much as possible in units of the REG bundling size.

FIG. 10A illustrates a REG mapping example when the number of symbols in a CORESET is 1 (=$2^0$).

As illustrated in FIG. 10A, when the number of symbols in a CORESET is 1, all REGs that constitute a CCE are arranged in the same symbol (symbol #0) even in the case of the time first mapping. Accordingly, for example, setting the number of symbols in a CORESET to 1 makes it possible to realize frequency first mapping with a design that is equivalent to the design for the time first mapping even without additionally defining mapping in the frequency first mapping.

In particular, changing a beam (precoding) for each symbol is conceivable in a high frequency band, for example, in a millimeter wave band. In such a case, when the terminal 200 (UE) monitors a plurality of CORESETs, each CORESET (FIG. 10A) being arranged in one symbol, by using a plurality of symbols, it is easy to perform time division multiplexing. Accordingly, in a high frequency band, limiting the number of symbols in a CORESET to 1 is also effective.

FIG. 10B illustrates a REG mapping example when the number of symbols in a CORESET is 2 (=$2^1$).

As illustrated in FIG. 10B, when the number of symbols in a CORESET is 2, two REGs of REGs that constitute a CCE are arranged in symbol #0, and the remaining two REGs are arranged in symbol #1. That is, two of the REGs that constitute a CCE are arranged in each of two symbols in units of the REG bundling size.

FIG. 10C illustrates a REG mapping example when the number of symbols in a CORESET is 4 (=$2^2$).

As illustrated in FIG. 10C, when the number of symbols in a CORESET is 4, REGs that constitute one CCE are arranged in two symbols in units of the REG bundling size (2 REGs). Also, for example, REGs that constitute two CCEs used for transmitting a DCI in aggregation level 2 are arranged in four different symbols.

When REGs in each CCE are arranged as illustrated in FIGS. 10B and 10C, REGs that constitute one or more CCEs used for transmitting a DCI are equally arranged in each symbol.

For example, FIG. 11 illustrates one example of the numbers of per-symbol REGs for respective aggregation levels (AL 1, AL 2, AL 4, and AL 8) when the number of REGs per CCE is 4, the number of symbols is 2, and the REG bundling number is 2 (see, for example, FIG. 10B). As illustrated in FIG. 11, it can be understood that the numbers of per-symbol REGs that constitute a CCE used for transmitting the same DCI are the same in any of the aggregation levels.

Also, FIG. 12 illustrates one example of the numbers of per-symbol REGs for the respective aggregation levels when the number of REGs per CCE is 4, the number of symbols is 4, and the REG bundling number is 2 (see, for example FIG. 10C). As illustrated in FIG. 12, in AL 1, four REGs that constitute one CCE used for transmitting a DCI are uniformly arranged in two symbols. Also, as illustrated in FIG. 12, the numbers of per-symbol REGs that constitute a CCE used for transmitting the same DCI are equal to each other in any aggregation level of AL 2, AL 4, and AL 8.

Thus, since a number of REGs that constitute each CCE, the number being a power of 2, are arranged in symbols in units of the REG bundling size that is a power of 2, the numbers of REGs that constitute a CCE used for transmitting a DCI become equal for the respective symbols, thus making it easy to adjust power across the CCEs.

Also, since mapping of REGs and mapping of CCEs to a search space are based on the time first mapping, a PDCCH (DCI) is arranged in a plurality of symbols when the aggregation level is high, thus providing an advantage that it is easy to perform power boosting.

Also, setting the REG bundling size to a power of 2 makes it possible to align spacings of PRBs in a frequency domain even when a terminal 200 having a different subcarrier spacing exists, thus making it possible to improve the use efficiency of resources.

Operation Example 1-2

Cases in which the number of symbols in a CORESET is a power of 2 have been described in operation example 1-1. In contrast, a case in which the number of symbols in a CORESET is a value other than a power of 2 will be described in operation example 1-2.

For example, when the number of symbols in a CORESET is a number of symbols other than a power of 2, REG mapping is set as a reference of REG mapping for the number of symbols which is larger than the number of symbols in a CORESET and which is a power of 2 closest thereto.

Figure 13:
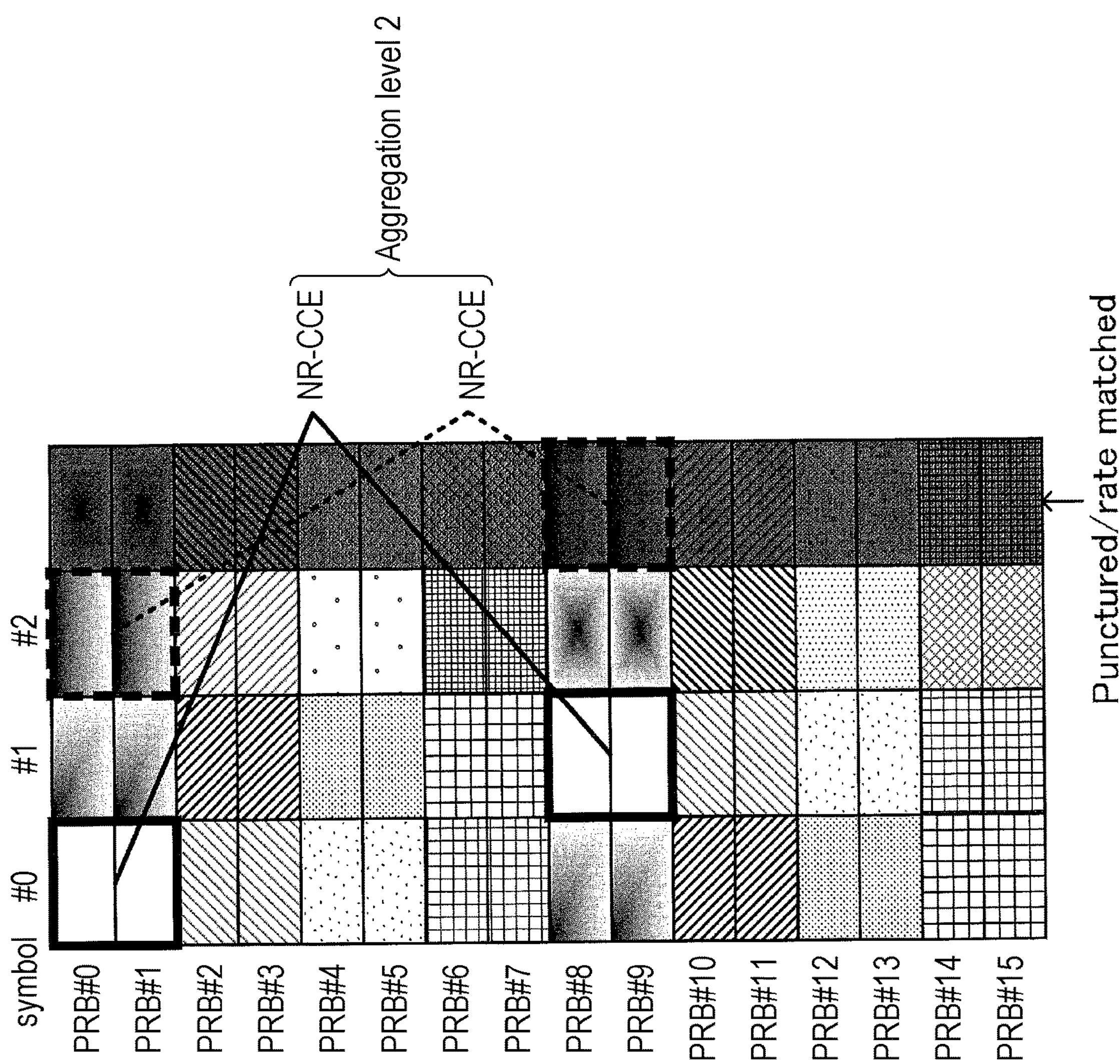
FIG. 13 illustrates a REG mapping example according to operation example 1-2 in the first embodiment.

Specifically, when the number of symbols in a CORESET is 3, the last symbol is punctured or rate-matched in REG mapping (see, for example, FIG. 10C) in which the number of symbols is 4 (=$2^2$), which is described above in operation example 1-1, to thereby set REG mapping for the symbols in the CORESET, as illustrated in FIG. 13.

With such an arrangement, the number of REGs that are actually used differs from that in the reference REG mapping, but when the aggregation level is 2, 4, or 8, the numbers of per-symbol REGs that constitute a CCE used for transmitting the same DCI become equal to each other. Also, since the design of common REG mapping can be used for all symbols, there is an advantage in that the design becomes simple.

For example, FIG. 14 illustrates the numbers of per-symbol REGs for the respective aggregation levels when the number of REGs per CCE is 4, the number of symbols is 3, and the REG bundling number is 2. FIG. 14 illustrates the numbers of per-symbol REGs when the last symbol is punctured or rate-matched based on REG mapping (see, for example, FIG. 10C or 12) when the number of REGs per CCE is 4, the number of symbols is 4, and the REG bundling number is 2. As illustrated in FIG. 14, in AL 2, AL 4, and AL 8, it can be understood that the numbers of per-symbol REGs that constitute a CCE used for transmitting the same DCI are equal to each other in any aggregation level.

Also, in AL 1, there are a case in which REGs that constitute one CCE used for transmitting a DCI are arranged in two symbols and a case in which the REGs are arranged in one symbol, as illustrated in FIG. 14. In AL 1, when the number of symbols in which REGs are arranged is one, that is, when the number of REGs is half the normal values (4 REGs), there may be cases in which sufficient reception quality cannot be expected. Accordingly, for AL 1, the terminal 200 may be limited to monitor only CCEs arranged in two symbols.

The description has been given of a case in which when the number of symbols in a CORESET is the number of symbols other than a power of 2, a symbol is punctured or rate-matched based on a REG mapping design for the number of symbols which is larger than the number of symbols in a CORESET. However, when the number of symbols in a CORESET is the number of symbols other than a power of 2, a symbol may be repeated based on the REG mapping design for the number of symbols which is smaller than the number of symbols in a CORESET. For example, when the number of symbols in a CORESET is 5, it is also possible to perform an operation in which REG mapping when the number of symbols is 5 is set by repeating the last symbol (symbol #3) or the front-end symbol (symbol #0) based on the REG mapping (see, for example, FIG. 10C) used when the number of symbols in a CORESET is 4.

Thus, according to operation example 1-2, even when the number of symbols in a CORESET is a number other than a power of 2, the number of REGs that constitute a CCE used for transmitting a DCI becomes equal for each symbol, making it easy to adjust power across CCEs.

The present disclosure is not limited to a case in which the number of symbols in a CORESET is 3 or 5 in operation example 1-2.

Operation Example 1-3

In operation example 1-3, a REG bundling in the same CCE is arranged in the same PRB, in addition to operation example 1-1 described above. That is, REGs that constitute one CCE are arranged in a plurality of symbols at the same frequency in units of the REG bundling size.

Also, at this point, DMRSs used for demodulating the CCE are arranged in the front-end symbol of a plurality of symbols in which the CCE is arranged and are not arranged in the remaining symbols.

With such an arrangement, it is possible to reduce the number of DMRSs.

Figure 15:
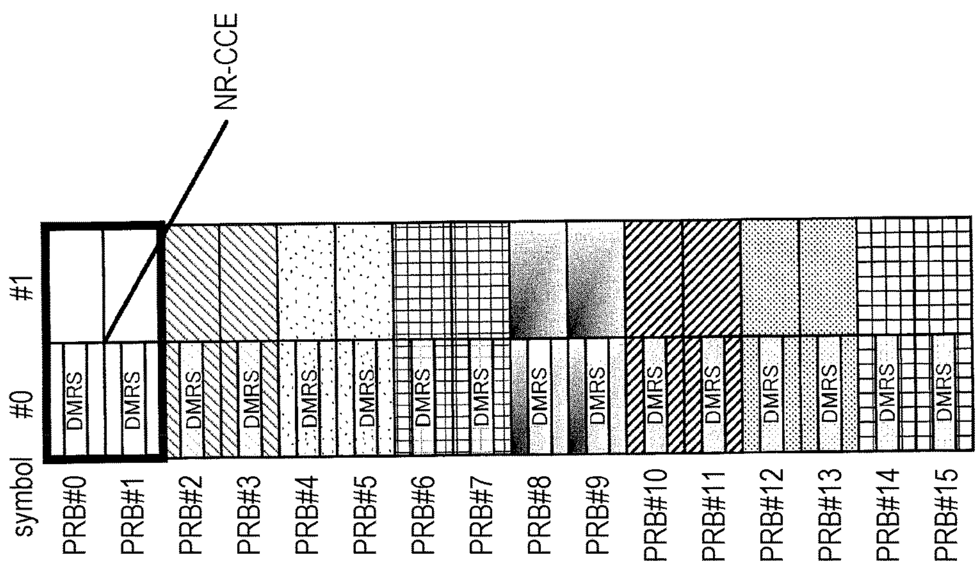
FIG. 15 illustrates a DMRS mapping example (when the number of symbols is 2) according to operation example 1-3 in the first embodiment.

FIG. 15 illustrates a DMRS and REG mapping example when the number of symbols in a CORESET is 2, the number of REGs per CCE is 4, and the REG bundling size is 2.

In FIG. 15, since the REG bundling size is 2, REGs that constitute the same CCE are arranged in two adjacent PRBs. Also, the REGs that constitute the same CCE are arranged in two symbols #0 and #1 at the same frequency (2 PRBs) in units of the REG bundling size.

At this point, as illustrated in FIG. 15, DMRSs are arranged in front-end symbol #0 of symbols in which REGs that constitute a CCE used for transmitting the same DCI and that are arranged at the same frequency in units of the REG bundling size are arranged. That is, no DMRS is arranged in symbol #1, as illustrated in FIG. 15. In this case, for symbol #1, the terminal 200 performs channel estimation by using the DMRSs in symbol #0 in which the REGs that constitute the same CCE are arranged.

Figure 16A:
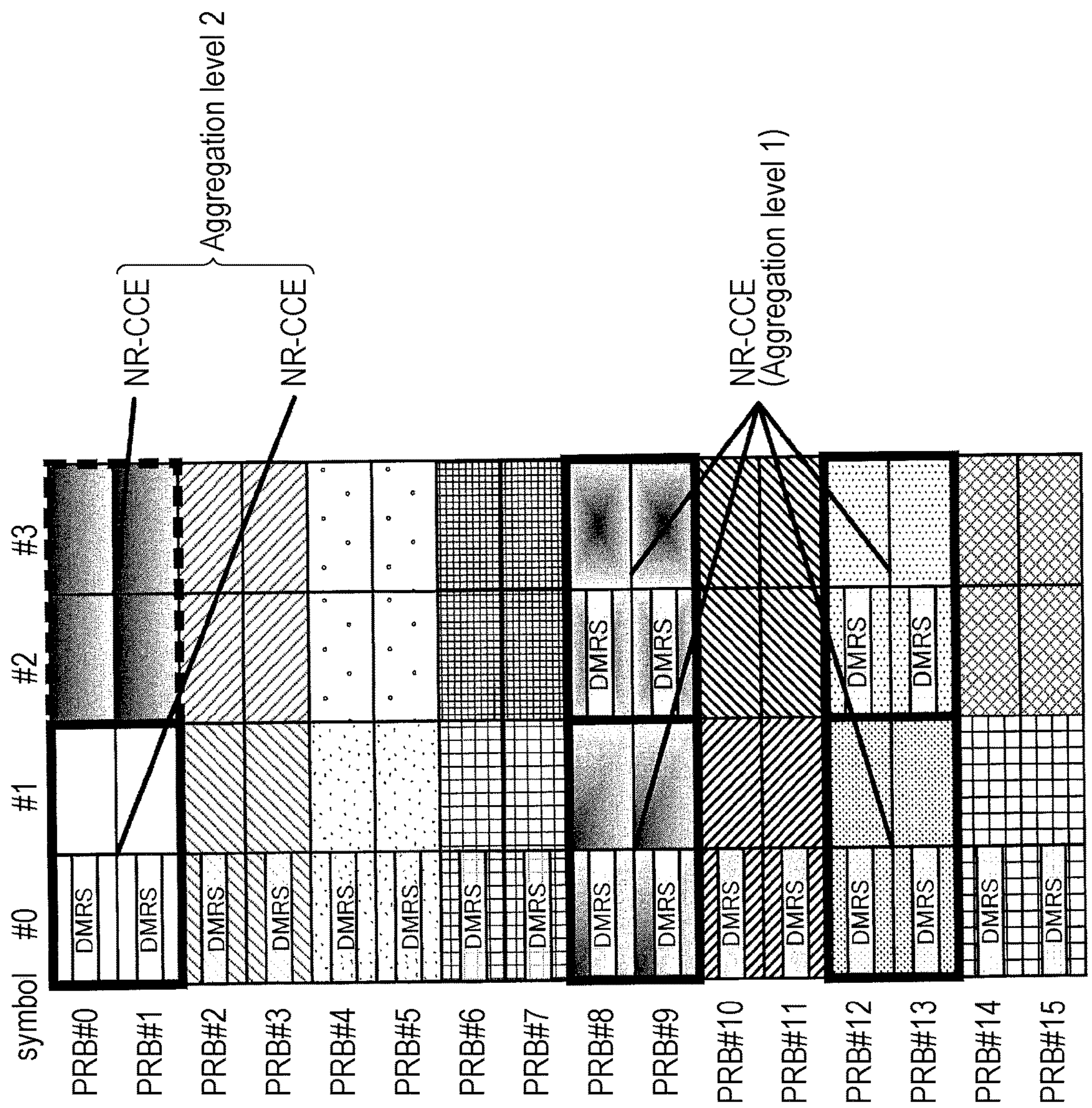
FIG. 16A illustrates a DMRS mapping example (when the number of symbols is 4) according to operation example 1-3 in the first embodiment.
Figure 16B:
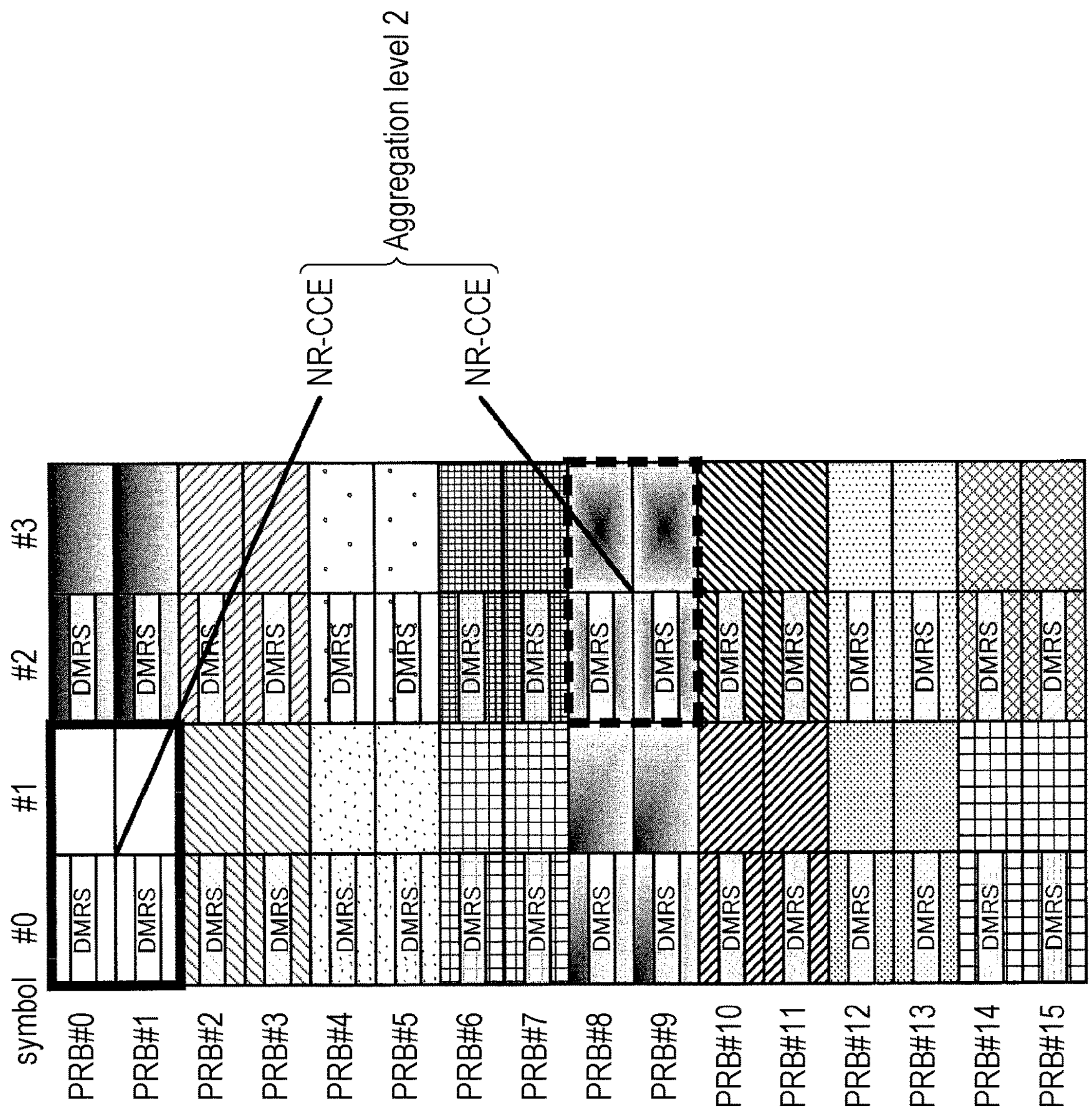
FIG. 16B illustrates a DMRS mapping example (when the number of symbols is 4) according to operation example 1-3 in the first embodiment.

Next, FIGS. 16A and 16B illustrate DMRS and REG mapping examples when the number of symbols in a CORESET is 4, the number of REGs per CCE is 4, and the REG bundling size is 2.

In FIGS. 16A and 16B, since the REG bundling size is 2, REGs that constitute the same CCE are arranged in two adjacent PRBs, as in FIG. 15.

In FIG. 16A, the REGs that constitute the same CCE are arranged in the same PRBs (2 PRBs) in units of the REG bundling.

At this point, DMRSs are arranged in the front-end symbol of symbols in which REGs that constitute a CCE used for transmitting the same DCI and that are arranged at the same frequency in units of the REG bundling size are arranged.

For example, in FIG. 16A, in the case of aggregation level 2, two CCEs used to transmit the same DCI are arranged in four symbols #0 to #3 in the same PRBs (see, for example, PRBs #0 and #1). In this case, for PRBs #0 and #1, the DMRSs are arranged in front-end symbol #0 and are not arranged in remaining symbols #1 to #3. Accordingly, for the PRBs (PRBs #0 and #1 in FIG. 16A) in which two CCEs used for a DCI in aggregation level 2 are arranged, the terminal 200 can also use DMRSs in symbol #0 to perform demodulation in symbols #2 and #3 in addition to symbol #1.

On the other hand, when the aggregation level is 1, the DMRSs are arranged in the front-end symbol (symbol #0 or symbol #2 in FIG. 16A) of the symbols in which one CCE (REGs) used for transmitting the same DCI is arranged, as in PRBs #8 and #9 and PRBs #12 and #13 in FIG. 16A. That is, in the case of aggregation level 1, the DMRSs are arranged in the front-end symbol of the symbols in which REGs that constitute each CCE are arranged.

Also, in FIG. 16B, in the case of aggregation level 2, two CCEs used for transmitting the same DCI are arranged in different PRBs (for example, PRBs #0 and #1 and PRBs #8 and #9). In this case, for each frequency (2 PRBs) in which the REGs are arranged in units of the REG bundling size, DMRSs are arranged in the front-end symbols of the symbols in which the REGs that constitute the CCEs are arranged. For example, when two CCEs used for transmitting the same DCI are a CCE arranged in symbols #0 and #1 in PRBs #0 and #1 and a CCE arranged in symbols #2 and #3 in PRBs #8 and #9, the DMRSs are respectively arranged in front-end symbols #0 and #2 of the symbols in which the CCEs in PRBs #0 and #1 and PRBs #8 and #9 are arranged. In this case, for the CCE arranged in symbols #0 and #1 in FIG. 16B, the terminal 200 performs channel estimation by using the DMRSs arranged in symbol #0, and for the CCE arranged in symbols #2 and #3, the terminal 200 performs channel estimation by using the DMRSs arranged in symbol #2.

Thus, according to operation example 1-3, a DMRS is shared in a CCE arranged in a plurality of symbols in the same PRB. Specifically, since DMRSs are arranged in the front-end symbol and are not arranged in the remaining symbols, it is possible to reduce the number of DMRSs. Also, by using the DMRSs arranged in the front-end symbol, the terminal 200 can quickly demodulate a DCI arranged in subsequent symbols.

When sharing DMRSs between a plurality of UEs is defined, the terminal 200 may be adapted to perform, even when two CCEs are arranged in different PRBs, channel estimation by using DMRSs arranged in the front-end PRBs of each CCE, in the case of aggregation level 2, as illustrated in FIG. 16B. With such an arrangement, although the precoding cannot be changed for each CCE, the amount of DMRS resources can be reduced by an amount corresponding to the DMRSs arranged in the subsequent PRBs. Also, when spatial or code multiplexing is performed on DMRSs, one part of the DMRSs multiplexed in the front-end symbols may be used for the frontward symbols, and another part of the DMRSs may be used for the rearward symbols.

The above description has been given of operation examples 1-1 to 1-3.

Thus, in the present embodiment, with respect to mapping of CCEs and REGs to be arranged in a CORESET, the number of REGs per CCE is a power of 2, and the REG bundling size is a power of 2.

That is, a plurality of REGs that constitute a CCE are separated into a power of 2 in units of the REG bundling size. As a result, the REG mapping design becomes simple. For example, when the number of symbols in a CORESET is a power of 2, the REGs in each CCE are uniformly arranged in the symbols in units of the REG bundling. Hence, the numbers of REGs across the symbols become equal in one or more CCEs used for transmitting a DCI, thus making it possible to prevent variations in the reception SINRs for the respective symbols and making it possible to simplify the adjustment of power across the CCEs.

Also, in the present embodiment, REG mapping when a CORESET has a number of symbols which is other than a power of 2 can be realized through symbol puncturing, repetition, or rate matching, based on REG mapping setting when the number of symbols is a power of 2 and by using the REG mapping setting. As a result, even when the number of symbols in a CORESET is not a power of 2, the numbers of REGs across the symbols become equal to each other, thus making it possible to prevent variations in the reception SINRs for the respective symbols and making it possible to simplify the adjustment of power across CCEs.

As described above, according to the present embodiment, it is possible to appropriately arrange CCEs that constitute a CORESET.

Although a REG mapping example when the number of REGs per CCE is 4 ($=2^2$) and the REG bundling size is 2 ($=2^1$) has been described above, the REG bundling size may be 4 ($=2^2$). In this case, REGs that constitute a CCE are arranged in the same symbol. Also, when the number of REGs that constitute a CCE (the number of REGs per CCE) is 8 ($=2^3$), the REG bundling size can be set to 2 ($=2^1$), 4 ($=2^2$), or 8 ($=2^3$).

The above description has been given of a case in which the base station 100 performs higher-layer signaling to notify the terminal 200 of the setting information of a CORESET to be set. The setting information of a CORESET, however, may be specified by the base station 100 and the terminal 200. In this case, the CORESET setting notification using the higher-layer signaling becomes unnecessary.

Second Embodiment

Since a base station and a terminal according to the present embodiment are common to the basic configuration of the base station 100 and the terminal 200 according to the first embodiment, a description will be given using FIGS. 7 and 8.

In the present embodiment, in CCE and REG mapping to a CORESET, the number of REGs per CCE is 6, and the REG bundling size is changed according to the number of symbols in the CORESET.

With such an arrangement, even when the number of REGs per CCE is 6, the numbers of REGs that are arranged in the respective symbols can be made equal even when the number of symbols in a CORESET is 2, 3, or 4.

Operation examples according to the present embodiment will be specifically described below.

In the following, the number of REGs per CCE is 6, the REG bundling size is 3 when the number of symbols in a CORESET is a power of 2 (1, 2, 4, 8, . . . ), and the REG bundling size is 2 when the number of symbols in a CORESET is 3 or 6. Also, the aggregation level is a power of 2.

FIGS. 17A to 17D illustrate a REG mapping example according to the present embodiment.

<Case in which Number of Symbols in CORESET is Power of 2>

Figure 17A:
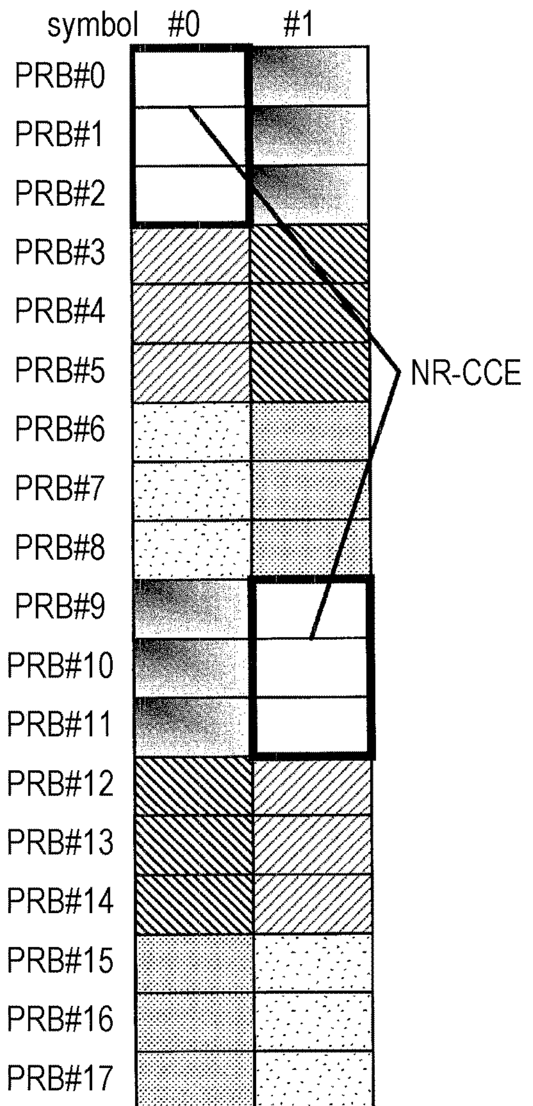
FIG. 17A illustrates a REG mapping example (when the number of symbols is 2) according to a second embodiment.
Figure 17B:
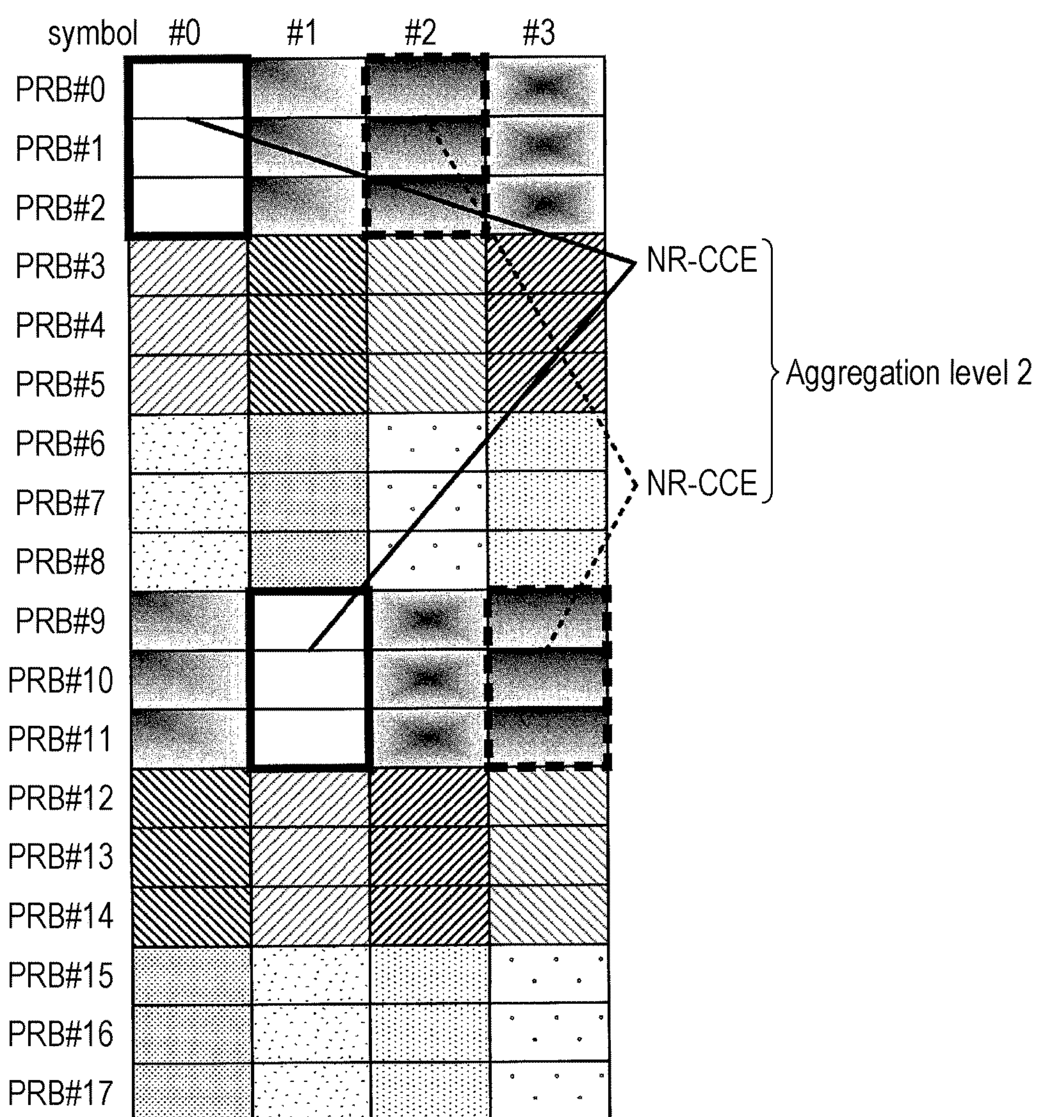
FIG. 17B illustrates a REG mapping example (when the number of symbols is 4) according to the second embodiment.

FIGS. 17A and 17B illustrate a REG mapping example when the number of symbols in a CORESET is a power of 2. Specifically, FIG. 17A illustrates a REG mapping example when a CORESET has two symbols, and FIG. 17B illustrates a REG mapping example when a CORESET has four symbols.

As illustrated in FIGS. 17A and 17B, the REG bundling size is 3 when the number of symbols in a CORESET is a power of 2.

In this case, when the mapping is time first mapping, each CCE is arranged in two symbols, as illustrated in FIGS. 17A and 17B. Also, when a CORESET has four symbols, three of REGs that constitute two CCEs used for transmitting a DCI are arranged in each of the four symbols, in aggregation level 2, as illustrated in FIG. 17B. Also, although not illustrated, symbol arrangement is similarly possible with the REG bundling size 3 even when the number of symbols in a CORESET is another value (one symbol or eight symbols) of a power of 2.

<Case in which Number of Symbols in CORESET is 3 or 6>

Figure 17C:
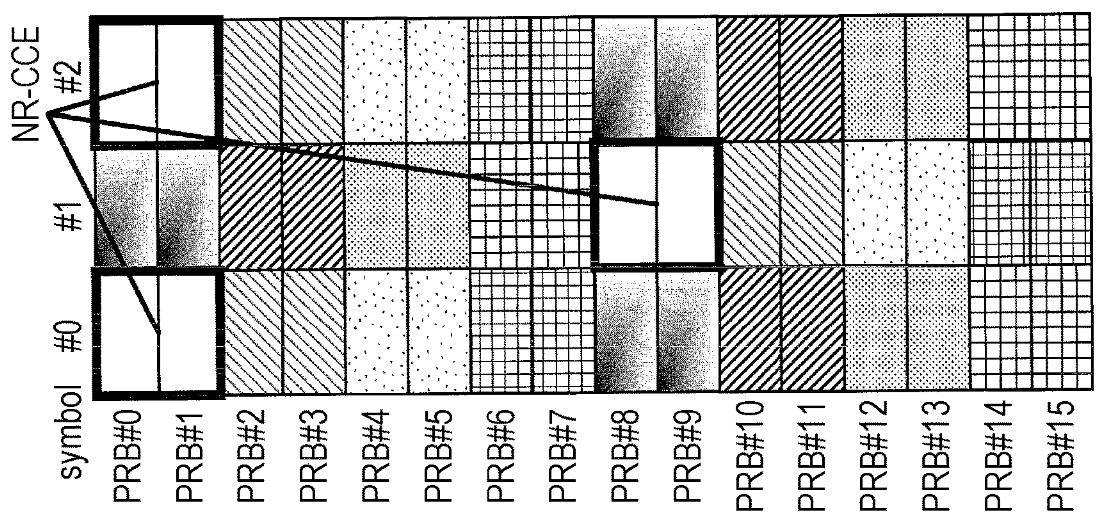
FIG. 17C illustrates a REG mapping example (when the number of symbols is 3) according to the second embodiment.
Figure 17D:
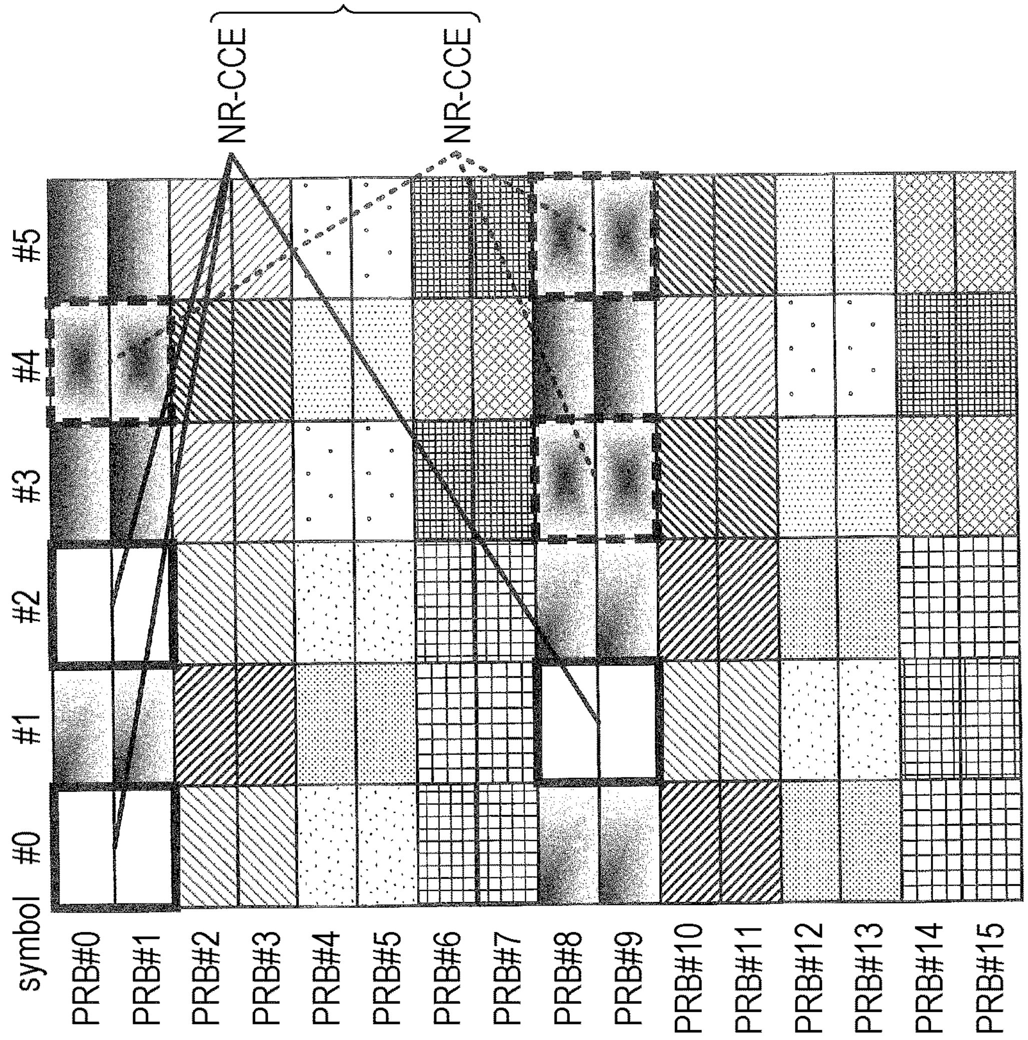
FIG. 17D illustrates a REG mapping example (when the number of symbols is 6) according to the second embodiment.

FIG. 17C illustrates a REG mapping example when a CORESET has three symbols, and FIG. 17D illustrates a REG mapping example when a CORESET has six symbols.

When the number of symbols in a CORESET is 3 or 6, the REG bundling size is 2, as illustrated in FIGS. 17C and 17D.

In this case, when the mapping is time first mapping, each CCE is arranged in three symbols, as illustrated in FIGS. 17C and 17D. Also, when the CORESET has six symbols, two of REGs that constitute two CCEs used for transmitting a DCI are arranged in each of six symbols, in aggregation level 2, as illustrated in FIG. 17D.

FIGS. 18, 19, 20, and 21 illustrate REG mapping examples for aggregation levels (AL 1, AL 2, AL 4, and AL 8) when the number of REGs per CCE is 6, and the numbers of symbols in a CORESET are 2, 4, 3, and 6 (see FIGS. 17A to 17D).

The numbers of REGs arranged in the symbols in all aggregation levels are equal to each other when the number of symbols in a CORESET is 2, which is illustrated in FIG. 18, and the number of symbols in a CORESET is 3, which is illustrated in FIG. 20.

Also, the numbers of REGs arranged in the symbols in aggregation level 2 or higher are equal to each other when the number of symbols in a CORESET is 4, which is illustrated in FIG. 19, and when the number of symbols in a CORESET is 6, which is illustrated in FIG. 21. Also, in aggregation level 1, when the number of symbols in a CORESET is 4, which is illustrated in FIG. 19, REGs that constitute a DCI are arranged in two symbols, and when the number of symbols in a CORESET is 6, which is illustrated in FIG. 21, REGs that constitute a DCI are arranged in three symbols.

As described above, in the present embodiment, the number of REGs per CCE is 6, and the REG bundling size is changed according to the number of symbols in a CORESET. As a result, in each CCE, REGs are uniformly arranged in each symbol in units of the REG bundling. Hence, the numbers of REGs across the symbols become equal in one or more CCEs used for transmitting a DCI, thus making it possible to prevent variations in the reception SINRs for the respective symbols and making it possible to simplify the adjustment of power across the CCEs.

The numbers of symbols, 5 and 7, in a CORESET, which are not described in the above examples may be extended to an actual number of symbols in a CORESET, by using puncturing, rate matching, or repetition based on a mapping design for the number of symbols (for example, the number of symbols, 2, 3, 4, or 6) which is the closest to the actual number of symbols in the CORESET, as in operation example 1-3.

Also, the number of symbols in a CORESET may be limited to the number of symbols, 1, 2, 3, 4, 6, or 8, which makes it easy to allocate six REGs, per CCE.

The above description has been given of each embodiment of the present disclosure.

Although, in the embodiments described above, physical mapping has been described as one example for frequency domains (PRB #), the present disclosure can also be applied to logical mapping. In the case of the logical mapping, the mapping is changed from the logical mapping to the physical mapping, and thus, even frequency domains that are contiguous in the logical mapping are arranged at physically discrete positions, thus obtaining a frequency diversity effect.

Also, although an example in which REGs that constitute each CCE are arranged in different PRBs for each REG bundling in order to obtain the frequency diversity effect has been described above, the mapping of REGs that constitute each CCE is not limited thereto.

The control resource set (CORESET) may also be called a search space (search space).

Also, a plurality of CORESETs may be set for a UE. For example, although, in the embodiments described above, symbol #0 has been described as being the front-end symbol in which a CORESET is set, another CORESET may be set from a rearward symbol.

Also, the higher-layer signaling may be replaced with MAC signaling. In the case of the MAC signaling, the frequency of changes of a case set for a UE can be increased, compared with the RRC signaling.

Also, the above-described DMRSs may be reference signals (Reference Signals) having a different name.

Also, the first and second embodiments described above may be combined together. That is, depending on a case in which the number of REGs per CCE is a power of 2 (the first embodiment) and a case in which the number of REGs per CCE is 6 (the second embodiment), the base station 100 and the terminal 200 may determine the REG bundling size or the number of symbols in a CORESET and may set REG mapping.

The present disclosure can be realized by software, hardware, or software in cooperation with hardware. Each functional block used in the description of each embodiment above can be partly or entirely realized by an LSI, which is an integrated circuit, and each process described in each embodiment above may be controlled partly or entirely by one LSI or a combination of LSIs. The LSI may be individually formed as chips or may be formed by one chip so as to include a part or all of the functional blocks. The LSI may comprise an input and an output of data. The LSI may be referred to as an IC, a system LSI, a super LSI, or an ultra LSI depending on a difference in the degree of integration. The technique of the circuit integration is not limited to the LSI and may be realized by using a dedicated circuit, a general-purpose processor, or a special-purpose processor. Also, an FPGA (field programmable gate array) that can be programmed after the manufacture of the LSI or a reconfigurable processor in which the connections and the settings of circuit cells arranged inside the LSI can be reconfigured may be used. The present disclosure may be realized as digital processing or analogue processing. In addition, when a technology for circuit integration that replaces LSI becomes available with the advancement of semiconductor technology or another derivative technology, such a technology may also naturally be used to integrate the functional blocks. Application of biotechnology or the like is possible.

A base station in the present disclosure comprises: circuitry that allocates downlink control signals to a control channel region constituted by a plurality of control channel elements (CCEs); and a transmitter that transmits the downlink control signals. The number of resource element groups (REGs) that constitute the CCE is a power of 2, and a bundling size indicating the number of REGs included in the REGs that constitute the CCE and arranged in adjacent resource blocks is a power of 2.

In the base station in the present disclosure, the number of symbols in which the control channel region is arranged is a power of 2.

In the base station in the present disclosure, the REGs that constitute one of the CCEs are arranged in a time direction prior to a frequency direction in units of the bundling size.

In the base station in the present disclosure, the circuit allocates the downlink control signals in a time direction prior to a frequency direction in units of the CCE.

In the base station in the present disclosure, REGs that constitute one of the CCEs are arranged in a plurality of symbols at a same frequency in units of the bundling size.

In the base station in the present disclosure, a reference signal is arranged in a front-end symbol of the plurality of symbols, and a reference signal is not arranged in a remaining symbol.

A station in the present disclosure comprises: circuitry that allocates downlink control signals to a control channel region constituted by a plurality of control channel elements (CCEs); and a transmitter that transmits the downlink control signals. The number of resource element groups (REGs) that constitute the CCE is 6. When the number of symbols in which the control channel region is arranged is a power of 2, a bundling size indicating the number of REGs included in the REGs that constitute the CCE and arranged in adjacent resource blocks is 3, and when the number of symbols in which the control channel region is arranged is 3 or 6, the bundling size is 2.

A terminal in the present disclosure comprises: a receiver that receives downlink control signals in a control channel region constituted by a plurality of control channel elements (CCEs); and circuitry that decodes the downlink control signals. The number of resource element groups (REGs) that constitute the CCE is a power of 2, and a bundling size indicating the number of REGs included in the REGs that constitute the CCE and arranged in adjacent resource blocks is a power of 2.

In a communication method in the present disclosure, downlink control signals are allocated to a control channel region constituted by a plurality of control channel elements (CCEs), and the downlink control signals are transmitted. The number of resource element groups (REGs) that constitute the CCE is a power of 2, and a bundling size indicating the number of REGs included in the REGs that constitute the CCE and arranged in adjacent resource blocks is a power of 2.

In a communication method in the present disclosure, downlink control signals are received with a control channel region constituted by a plurality of control channel elements (CCEs), and the downlink control signals are decoded. The number of resource element groups (REGs) that constitute the CCE is a power of 2, and a bundling size indicating the number of REGs included in the REGs that constitute the CCE and arranged in adjacent resource blocks is a power of 2.

One embodiment of the present disclosure is useful for a mobile communications system.

REFERENCE SIGNS LIST

100 base station
101 CORESET setting unit
102 DCI generating unit
103, 207 error-correction encoding unit
104, 208 modulating unit
105, 209 signal allocating unit
106, 210 transmitting unit
107, 201 receiving unit
108, 202 signal separating unit
109, 204 demodulating unit
110, 205 error-correction decoding unit
200 terminal
203 DCI receiving unit
206 setting-information receiving unit

The invention claimed is:

1. A communication apparatus comprising:

a receiver which, in operation, receives a control channel element (CCE) in a physical downlink control channel (PDCCH); and circuitry which, in operation, demodulates the PDCCH, wherein the CCE is formed of six (6) resource-element groups (REGs) in a control-resource set (CORESET), the 6 REGs being bundled into REG bundles, and a REG bundle size of the REG bundles is different according to a number of symbols of the CORESET.

2. The communication apparatus according to claim 1, wherein the number of symbols of the CORESET is indicated by a higher layer signaling.

3. The communication apparatus according to claim 1, wherein the number of symbols of the CORESET corresponds to a time duration of the CORESET.

4. The communication apparatus according to claim 1, in a case that the number of symbols of the CORESET is 2 or 3, the CCE is arranged over a plurality of the symbols of the CORESET.

5. The communication apparatus according to claim 1, wherein a common demodulation reference signal (DMRS) is used for each of the REG bundles.

6. The communication apparatus according to claim 1, wherein REGs included in each of the REG bundles are adjacent to each other.

7. A communication method comprising:

receiving a control channel element (CCE) in a physical downlink control channel (PDCCH); and demodulating the PDCCH, wherein the CCE is formed of six (6) resource-element groups (REGs) in a control-resource set (CORESET), the 6 REGs being bundled into REG bundles, and a REG bundle size of the REG bundles is different according to a number of symbols of the CORESET.

8. The communication method according to claim 7, wherein the number of symbols of the CORESET is indicated by a higher layer signaling.

9. The communication method according to claim 7, wherein the number of symbols of the CORESET corresponds to a time duration of the CORESET.

10. The communication method according to claim 7, in a case that the number of symbols of the CORESET is 2 or 3, the CCE is arranged over a plurality of the symbols of the CORESET.

11. The communication method according to claim 7, wherein a common demodulation reference signal (DMRS) is used for each of the REG bundles.

12. The communication method according to claim 7, wherein REGs included in each of the REG bundles are adjacent to each other.

* * * * *